US012627597B2

(12) United States Patent
Chen

(10) Patent No.: US 12,627,597 B2
(45) Date of Patent: May 12, 2026

(54) SEGMENT ROUTING POINT TO MULTIPOINT PATH

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 18/082,999

(22) Filed: Dec. 16, 2022

(65) Prior Publication Data

US 2023/0121236 A1 Apr. 20, 2023

Related U.S. Application Data

(63) Continuation of application No. PCT/US2021/023328, filed on Mar. 19, 2021.

(60) Provisional application No. 63/039,856, filed on Jun. 16, 2020.

(51) Int. Cl.
*H04L 45/00* (2022.01)
*H04L 45/16* (2022.01)

(52) U.S. Cl.
CPC .............. *H04L 45/34* (2013.01); *H04L 45/16* (2013.01)

(58) Field of Classification Search
None
See application file for complete search history.

(56) References Cited

U.S. PATENT DOCUMENTS

| | | | |
|---|---|---|---|
| 8,223,669 B2 | 7/2012 | Chen et al. | |
| 8,488,616 B2 | 7/2013 | Wijnands et al. | |
| 8,773,978 B2 | 7/2014 | Chen | |
| 8,908,501 B2 | 12/2014 | Chen | |
| 9,143,434 B2 | 9/2015 | Chen et al. | |
| 9,838,246 B1 | 12/2017 | Hegde et al. | |
| 10,069,639 B2 | 9/2018 | Bragg et al. | |
| 10,158,558 B1 | 12/2018 | Ward et al. | |
| 10,686,699 B2 | 6/2020 | Duncan et al. | |
| 11,165,691 B1 | 11/2021 | Kompella et al. | |
| 11,695,685 B2 | 7/2023 | Bidgoli | |
| 11,777,847 B1 * | 10/2023 | Shen ........................ | H04L 45/50 |
| | | | 709/238 |
| 11,784,889 B2 | 10/2023 | Bashandy et al. | |
| 12,170,613 B2 * | 12/2024 | Chen ........................ | H04L 45/24 |

(Continued)

FOREIGN PATENT DOCUMENTS

| | | |
|---|---|---|
| CN | 105827529 A | 8/2016 |
| CN | 111147373 A | 5/2020 |
| WO | 2021257141 A1 | 12/2021 |

OTHER PUBLICATIONS

D. Voyer, Ed et al., "SR Replication Policy for P2MP Service Delivery" published on Jul. 2, 2019, pp. 1-8 Source: https://datatracker.ietf.org/doc/html/draft-voyer-spring-sr-p2mp-policy-03 (Year: 2019).*

(Continued)

*Primary Examiner* — Xavier S Wong

(74) *Attorney, Agent, or Firm* — Conley Rose, P.C.

(57) ABSTRACT

Disclosed is a mechanism implemented by an ingress node in a network. The mechanism comprises receiving, at a receiver of the ingress node, a packet. A segment list describing a segment routing point-to-multipoint (SR P2MP) path is pushed onto the packet. The packet is transmitted on a downstream interface along the SR P2MP path.

15 Claims, 9 Drawing Sheets

(56)          References Cited

U.S. PATENT DOCUMENTS

| | | | |
|---|---|---|---|
| 2009/0252058 | A1 | 10/2009 | Chen et al. |
| 2010/0008222 | A1 | 1/2010 | Le Roux et al. |
| 2012/0027013 | A1 | 2/2012 | Napierala |
| 2013/0177018 | A1 | 7/2013 | Wijnands et al. |
| 2014/0269421 | A1 | 9/2014 | Previdi et al. |
| 2017/0033939 | A1 | 2/2017 | Bragg et al. |
| 2018/0324090 | A1 | 11/2018 | Duncan et al. |
| 2020/0358698 | A1 | 11/2020 | Song et al. |
| 2021/0092043 | A1 | 3/2021 | Filsfils et al. |
| 2021/0144086 | A1* | 5/2021 | Bidgoli ............... H04L 41/0803 |
| 2021/0306259 | A1 | 9/2021 | Dutta |
| 2021/0352011 | A1* | 11/2021 | Boutros .................. H04L 45/48 |
| 2021/0409321 | A1 | 12/2021 | Li et al. |
| 2022/0014460 | A1 | 1/2022 | Filsfils et al. |
| 2022/0269167 | A1 | 8/2022 | Gronenborn |
| 2023/0121236 | A1 | 4/2023 | Chen |
| 2023/0269167 | A1 | 8/2023 | Bhargava et al. |
| 2024/0195741 | A1* | 6/2024 | Zhang ................... H04L 45/484 |

OTHER PUBLICATIONS

Mays AL-Naday, Martin J. Reed, Janne Riihijarvi, Dirk Trossen, Nikolaos Thomos, Mohammed Q. S. Al-Khalidi "Service-based Fog architecture without DNS redirection" pp. 1-8; (https://arxiv.org/abs/1803.00899); published on Mar. 2, 2018. (Year: 2018).*

Kiwoong Kwon; Minkeun Ha; Seong Hoon Kim; Daeyoung Kim "TAMR: Traffic-aware multipath routing for fault tolerance in 6LoWPAN" 2013 IEEE Global Communications Conference (GLOBECOM); pp. 109-114; conference dated Dec. 9-13, 2013. (Year: 2013).*

Sheu, J-P., et al., "A Scalable and Bandwidth-Efficient Multicast Algorithm based on Segment Routing in Software-Defined Networking," 2017 IEEE International Conference on Communications (ICC), 2017, 6 pages.

Previdi, S., et al., "Advertising Segment Routing Policies in BGP," Network Working Group, draft-ietf-idr-segment-routing-te-policy-08, Nov. 18, 2019, 44 pages.

Bidgoli, Ed., H., et al., "Advertising p2mp policies in BGP," Network Working group, draft-hb-idr-sr-p2mp-policy-00, Oct. 28, 2019, 16 pages.

Eckert, T., Ed., et al., "Tree Engineering for bit Index Explicit Replication(BIER-TE),"draft-ietf-bier-te-arch-07, Network Working Group, Mar. 9, 2020, 37 pages.

H. Chen, M. McBride et al., "SRv6 Point-to-Multipoint Path," draft-chen-pim-srv6-p2mp-path-00, Network Working Group, Jul. 12, 2020, 11 pages.

* cited by examiner

100

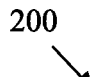
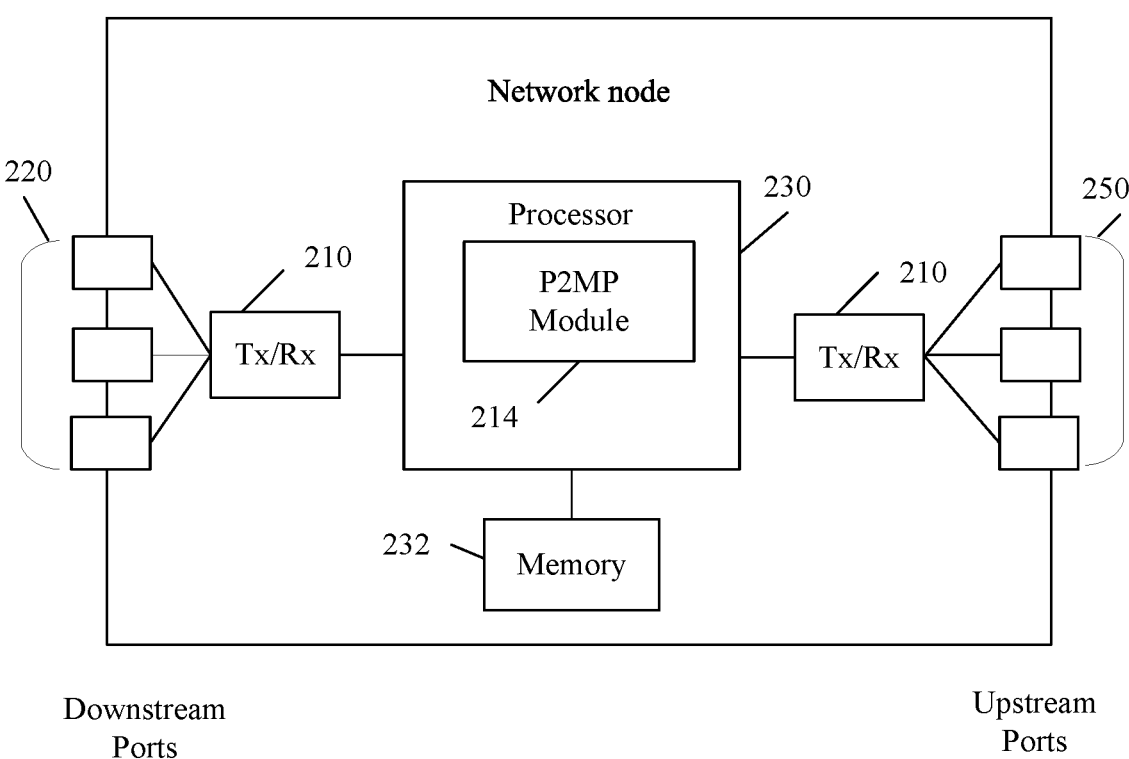
FIG. 2

300

310          311          313

| Multicast Node SID Block | Node ID | Arguments |

400

410          411          414          416          413

| Multicast Node SID Block | Node ID | No. Branches | No. SIDs | Arguments |

500

510 511 514 516 513

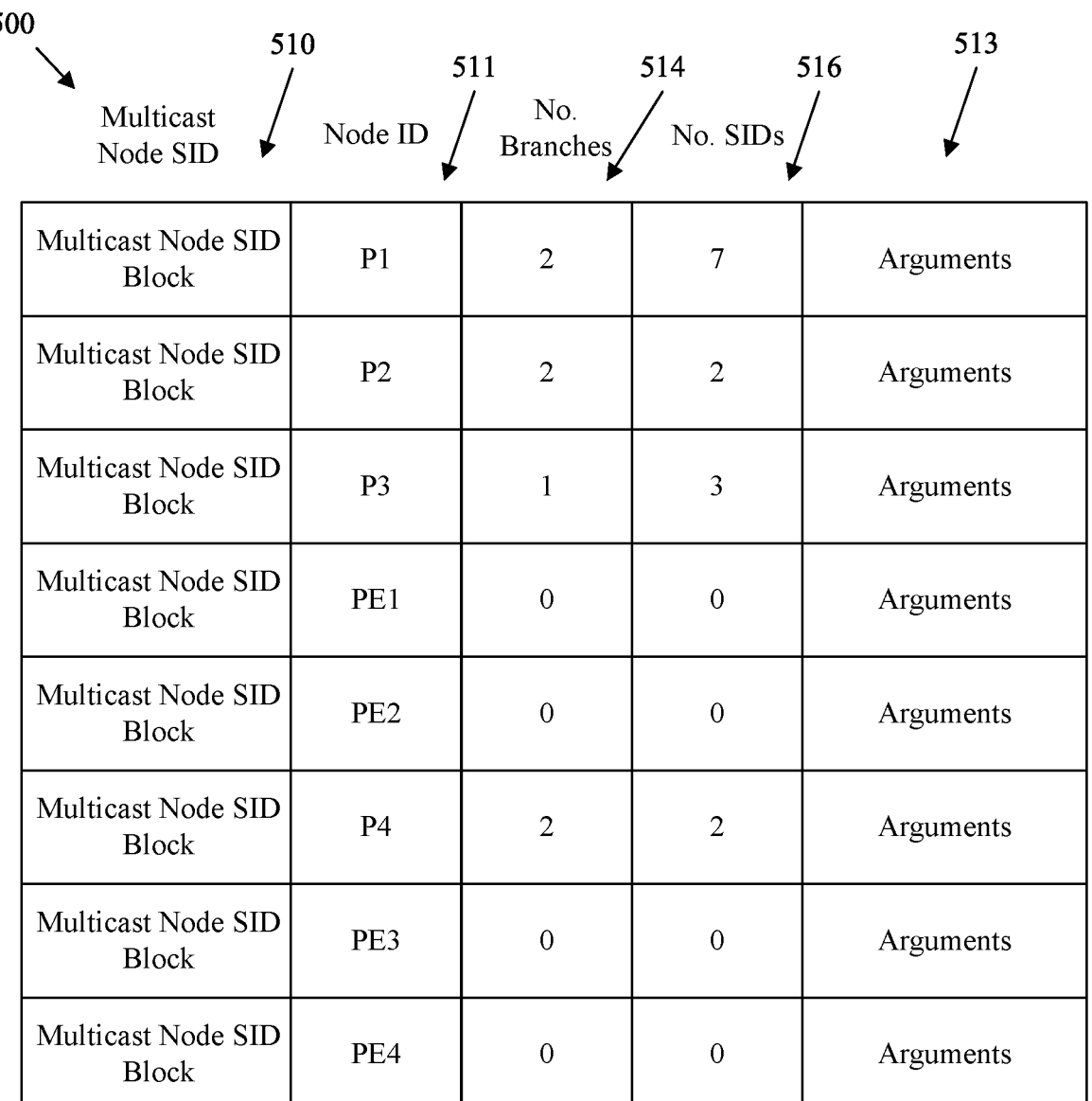

| Multicast Node SID | Node ID | No. Branches | No. SIDs | |
|---|---|---|---|---|
| Multicast Node SID Block | P1 | 2 | 7 | Arguments |
| Multicast Node SID Block | P2 | 2 | 2 | Arguments |
| Multicast Node SID Block | P3 | 1 | 3 | Arguments |
| Multicast Node SID Block | PE1 | 0 | 0 | Arguments |
| Multicast Node SID Block | PE2 | 0 | 0 | Arguments |
| Multicast Node SID Block | P4 | 2 | 2 | Arguments |
| Multicast Node SID Block | PE3 | 0 | 0 | Arguments |
| Multicast Node SID Block | PE4 | 0 | 0 | Arguments |

501

| Multicast Node SID Block | PE5 | 0 | 0 | Arguments |
|---|---|---|---|---|

| Multicast Adjacency SID Locator | Link No. | Arguments |

| Multicast Adjacency SID Locator | Link No. | No. Branches | No. SIDs | Arguments |

| Multicast Adjacency SID Locator 810 | Link No. 811 | No. Branches 814 | No. SIDs 816 | 813 |
|---|---|---|---|---|
| P1-m | P1-1m | 2 | 7 | Arguments |
| P2-m | P2-1m | 2 | 2 | Arguments |
| P3-m | P3-1m | 1 | 3 | Arguments |
| PE1-m | PE1-1m | 0 | 0 | Arguments |
| PE2-m | PE2-1m | 0 | 0 | Arguments |
| P4-m | P4-1m | 2 | 2 | Arguments |
| PE3-m | PE3-1m | 0 | 0 | Arguments |
| PE4-m | PE4-1m | 0 | 0 | Arguments |

801

| PE5-m | PE5-1m | 0 | 0 | Arguments |
|---|---|---|---|---|

FIG. 8

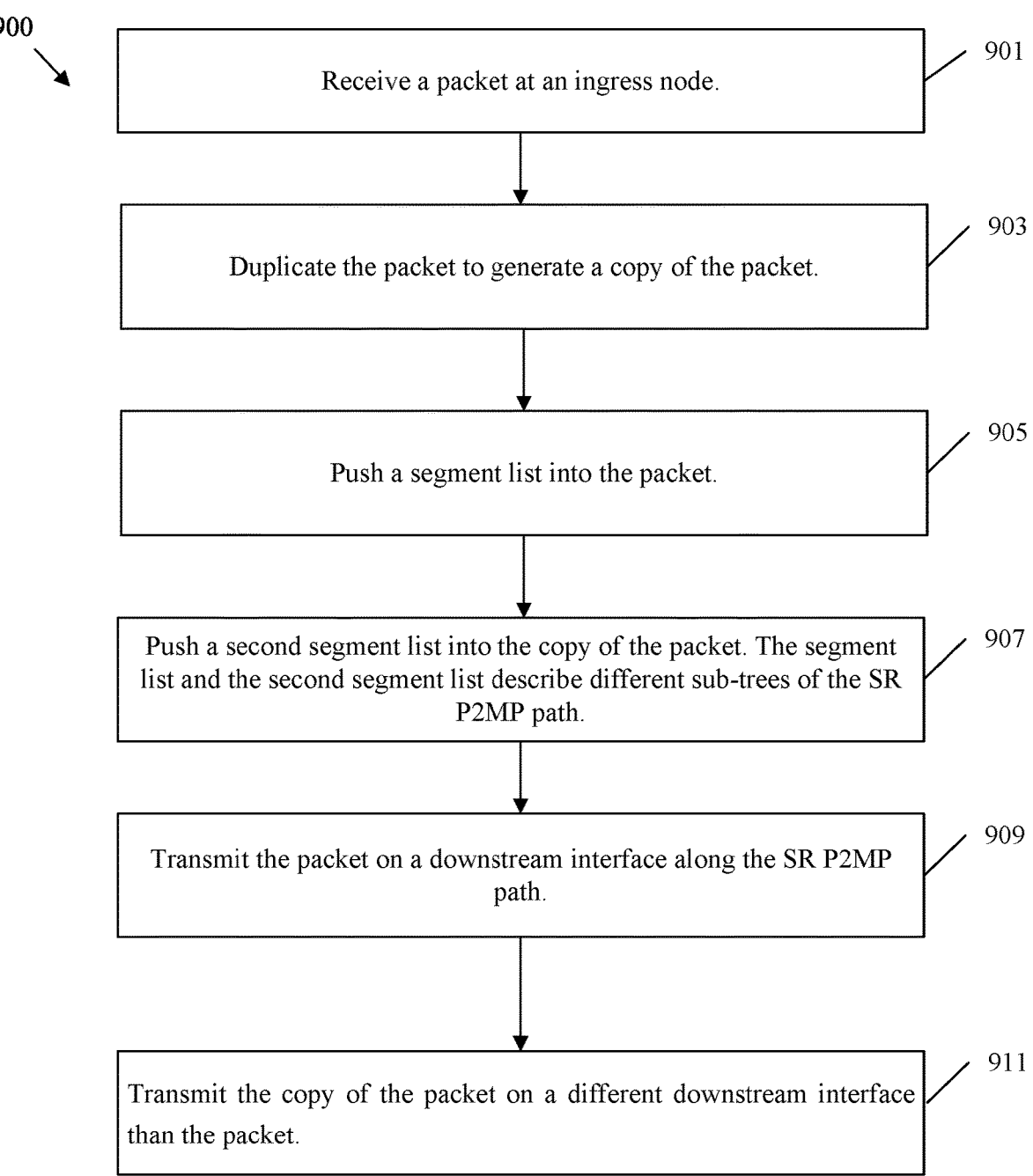

900

Receive a packet at an ingress node.                                         901

Duplicate the packet to generate a copy of the packet.                      903

Push a segment list into the packet.                                        905

Push a second segment list into the copy of the packet. The segment          907
list and the second segment list describe different sub-trees of the SR
P2MP path.

Transmit the packet on a downstream interface along the SR P2MP             909
path.

Transmit the copy of the packet on a different downstream interface        911
than the packet.

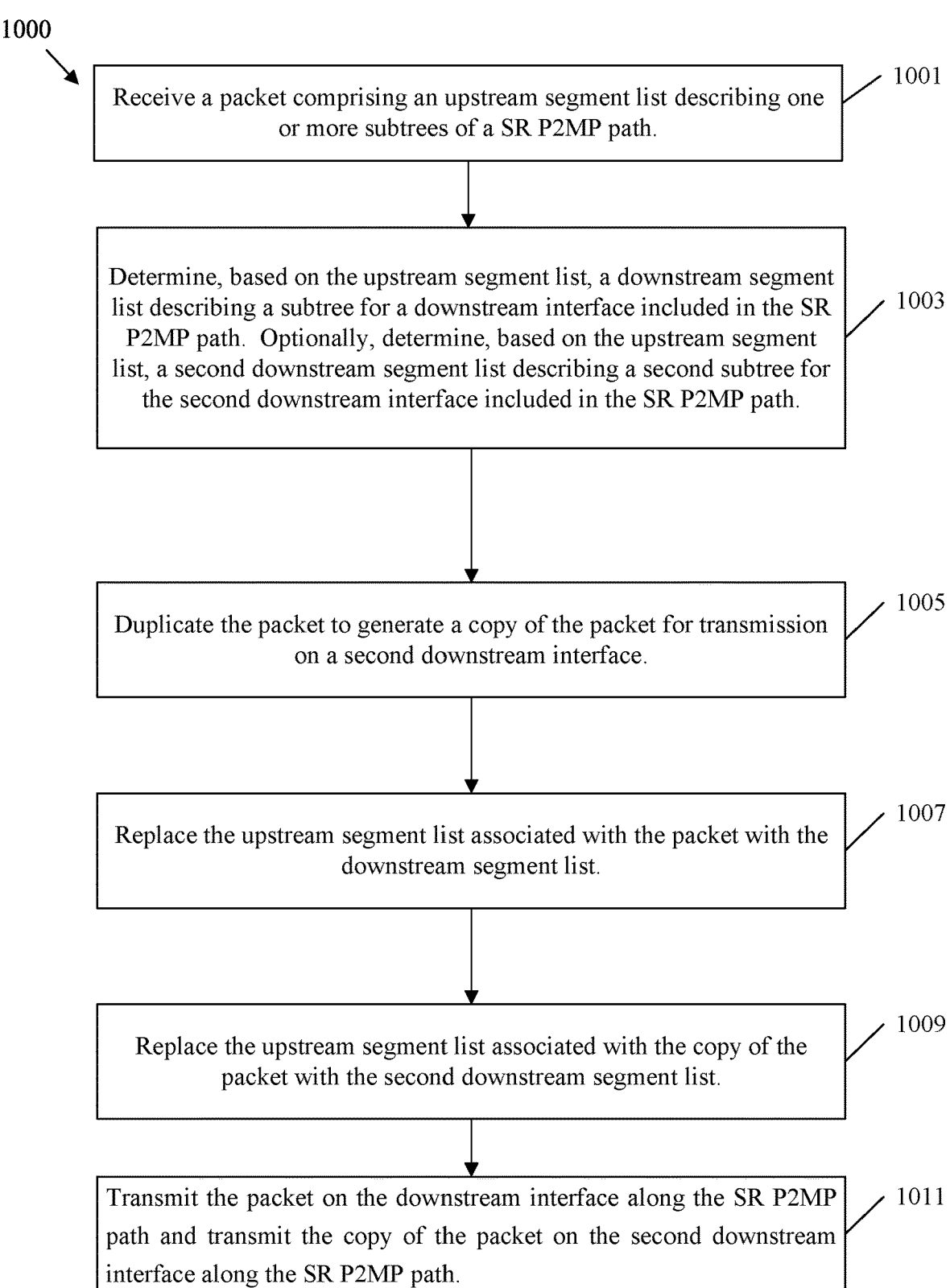

Receive a packet comprising an upstream segment list describing one or more subtrees of a SR P2MP path.                    1001

Determine, based on the upstream segment list, a downstream segment list describing a subtree for a downstream interface included in the SR P2MP path. Optionally, determine, based on the upstream segment list, a second downstream segment list describing a second subtree for the second downstream interface included in the SR P2MP path.                    1003

Duplicate the packet to generate a copy of the packet for transmission on a second downstream interface.                    1005

Replace the upstream segment list associated with the packet with the downstream segment list.                    1007

Replace the upstream segment list associated with the copy of the packet with the second downstream segment list.                    1009

Transmit the packet on the downstream interface along the SR P2MP path and transmit the copy of the packet on the second downstream interface along the SR P2MP path.                    1011

SEGMENT ROUTING POINT TO MULTIPOINT PATH

CROSS-REFERENCE TO RELATED APPLICATIONS

This patent application is a continuation of International Application No. PCT/US2021/023328, filed Mar. 19, 2021 by Huaimo Chen, and titled "Segment Routing Point To Multipoint Path" which claims the benefit of U.S. Provisional Patent Application No. 63/039,856, filed Jun. 16, 2020 by Huaimo Chen, and titled "Segment Routing Point To Multipoint Path," which is hereby incorporated by reference.

TECHNICAL FIELD

The present disclosure is generally related to network communication, and is specifically related to a mechanism to create a point to multipoint (P2MP) path using segment routing (SR) in an internet protocol version six (IPv6) network.

BACKGROUND

Certain networks employ network states to route network packets. For example, a controller can create a path across a network by assigning forwarding states to nodes along the path. Each node may store one or more states for each path that crosses the node, for example in a forwarding table in memory. As a network continues to create new paths, the forwarding tables of such nodes can become progressively more crowded. As such, the memory assigned to such tables may limit the number of paths that can cross a node. Further, as a forwarding table increases in size, the processing resources used to search the forwarding table increase. Hence, path states employ increasing memory and processing resources as the number of paths in a network increase. As such, networks that use states to describe paths are not as scalable as stateless networks.

SUMMARY

In an embodiment, the disclosure includes a method implemented by an ingress node in a network, the method comprising: receiving a packet; pushing, by a processor of the ingress node, a segment list describing a segment routing point-to-multipoint (SR P2MP) path onto the packet; and transmitting the packet on a downstream interface along the SR P2MP path.

Segment Routing (SR) is a routing protocol that supports routing without maintaining states across a network. Specifically, SR employs segment lists to describe a path. In point-to-point (P2P) routing, the segment list is implemented as a stack of labels or SIDs that describe segments of the path. A packet is encapsulated with the segment list. Each node in a path can pop the top label from the packet and forward the packet according to the next label in the stack. In this way, the only node that maintains a state is the ingress node. Transit nodes and egress nodes forward packets based on the label stack, and hence the SR protocol is stateless over the core network. SR works well for P2P paths, but is not designed to support P2MP paths. For example, routing protocols that support P2MP paths are stateful, and hence do not integrate with the stateless approach used in SR. For example, some routing protocols compute a P2MP path and create states at each node to support forwarding along the P2MP path.

The present aspect includes a SR based mechanism for creating and maintaining P2MP paths in a stateless manner through an IPv6 network. An ingress node can create a segment list that describes a P2MP path through the network. The segment list contains multicast SIDs of nodes in the P2MP path. The multicast SIDs can identify the nodes and/or can identify links/interfaces for the nodes, depending on the example. The multicast SIDs contain a number of branches field and a number of SIDs field. The number of branches indicates the number of segments of the P2MP path that extend downstream from the corresponding node. The number of SIDs indicate the number of multicast nodes contained in the P2MP path downstream of the corresponding node. Such information can be pushed onto a packet by an ingress node via encapsulation. The packet can then be transmitted downstream for duplication and/or routing along the P2MP path as indicated. For example, each current node (e.g., ingress and transit nodes) can duplicate the packet a number of times equal to the branches indicated by the number of branches for the multicast SID indicated for the current node. The current node can then encapsulate each packet with a segment list that describes the sub-tree of the P2MP path downstream from the current node along the corresponding branch prior to forwarding the packet. The multicast SID for the next hop node and associated parameters can be included in the destination address for the packet, and the address for the current node can be included in the source address. This allows for the creation of stateless P2MP communication across an IPv6 network via SR. As such, the described examples create additional functionality for nodes in a IPv6 core network. Further, the described examples remove the need to maintain states in the core network, and hence reduces memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, further comprising transmitting a copy of the packet on a different downstream interface than the packet, wherein the copy of the packet comprises a second segment list, and wherein the segment list and the second segment list describe different sub-trees of the SR P2MP path.

Optionally, in any of the preceding aspects, another implementation of the aspect provides, wherein the SR P2MP path is stateless across the network.

Optionally, in any of the preceding aspects, another implementation of the aspect provides, wherein pushing the segment list onto the packet further comprises setting a multicast segment identifier (SID) of a next hop along a sub-tree of the SR P2MP path as a destination address of the packet.

Optionally, in any of the preceding aspects, another implementation of the aspect provides, wherein the segment list comprises multicast SIDs of each node or each link in the sub-tree of the SR P2MP path.

Optionally, in any of the preceding aspects, another implementation of the aspect provides, wherein each multicast SID comprises a multicast block prefix, a node identifier, and arguments.

Optionally, in any of the preceding aspects, another implementation of the aspect provides, wherein each multicast SID comprises a multicast adjacency SID locator, a link number, and arguments.

Optionally, in any of the preceding aspects, another implementation of the aspect provides, wherein the arguments comprise a number of branches of the sub-tree that are associated with a corresponding node.

Optionally, in any of the preceding aspects, another implementation of the aspect provides, wherein the arguments further comprise a number of SIDs included in the sub-tree downstream of the corresponding node.

In an embodiment, the disclosure includes a method implemented by a transit node in a network along a SR P2MP path, the method comprising: receiving a packet comprising an upstream segment list describing one or more sub-trees of the SR P2MP path; determining, by a processor of the transit node and based on the upstream segment list, a downstream segment list describing a sub-tree for a downstream interface of the transit node included in the SR P2MP path; replacing, by the processor, the upstream segment list associated with the packet with the downstream segment list; and transmitting the packet on the downstream interface along the SR P2MP path.

SR is a routing protocol that supports routing without maintaining states across a network. Specifically, SR employs segment lists to describe a path. In P2P routing, the segment list is implemented as a stack of labels or SIDs that describe segments of the path. A packet is encapsulated with the segment list. Each node in a path can pop the top label from the packet and forward the packet according to the next label in the stack. In this way, the only node that maintains a state is the ingress node. Transit nodes and egress nodes forward packets based on the label stack, and hence the SR protocol is stateless over the core network. SR works well for P2P paths, but is not designed to support P2MP paths. For example, routing protocols that support P2MP paths are stateful, and hence do not integrate with the stateless approach used in SR. For example, some routing protocols compute a P2MP path and create states at each node to support forwarding along the P2MP path.

The present aspect includes a SR based mechanism for creating and maintaining P2MP paths in a stateless manner through an IPv6 network. An ingress node can create a segment list that describes a P2MP path through the network. The segment list contains multicast SIDs of nodes in the P2MP path. The multicast SIDs can identify the nodes and/or can identify links/interfaces for the nodes, depending on the example. The multicast SIDs contain a number of branches field and a number of SIDs field. The number of branches indicates the number of segments of the P2MP path that extend downstream from the corresponding node. The number of SIDs indicate the number of multicast nodes contained in the P2MP path downstream of the corresponding node. Such information can be pushed onto a packet by an ingress node via encapsulation. The packet can then be transmitted downstream for duplication and/or routing along the P2MP path as indicated. For example, each current node (e.g., ingress and transit nodes) can duplicate the packet a number of times equal to the branches indicated by the number of branches for the multicast SID indicated for the current node. The current node can then encapsulate each packet with a segment list that describes the sub-tree of the P2MP path downstream from the current node along the corresponding branch prior to forwarding the packet. The multicast SID for the next hop node and associated parameters can be included in the destination address for the packet, and the address for the current node can be included in the source address. This allows for the creation of stateless P2MP communication across an IPv6 network via SR. As such, the described examples create additional functionality for nodes in a IPv6 core network. Further, the described examples remove the need to maintain states in the core network, and hence reduces memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, further comprising: duplicating, by the processor, the packet to generate a copy of the packet for transmission on a second downstream interface of the transit node; determining, by the processor based on the upstream segment list, a second downstream segment list describing a second sub-tree for the second downstream interface included in the SR P2MP path; replacing, by the processor, the upstream segment list associated with the copy of the packet with the second downstream segment list; and transmitting, by the transmitter, the copy of the packet on the second downstream interface along the SR P2MP path.

Optionally, in any of the preceding aspects, another implementation of the aspect provides, wherein replacing the upstream segment list with the second downstream segment list includes duplicating the packet containing the upstream segment list and then replacing the upstream segment list with the second downstream segment list in the copy of the packet.

Optionally, in any of the preceding aspects, another implementation of the aspect provides, wherein replacing the upstream segment list with the second downstream segment list includes removing the upstream segment list from the packet prior to duplication and pushing the second downstream segment list onto the copy of the packet.

Optionally, in any of the preceding aspects, another implementation of the aspect provides, wherein the packet, as received, contains a destination address identifying the transit node, wherein the destination address includes arguments comprising a number of branches associated with the transit node.

Optionally, in any of the preceding aspects, another implementation of the aspect provides, wherein the upstream segment list comprises multicast SIDs of each node or each link in the sub-tree associated with the transit node.

Optionally, in any of the preceding aspects, another implementation of the aspect provides, wherein each multicast SID comprises a number of SIDs included in a sub-tree downstream of the corresponding node.

Optionally, in any of the preceding aspects, another implementation of the aspect provides, wherein determining the downstream segment list comprises: employing the number of branches indicated in the destination address to determine a number of next hop nodes; employing the number of SIDs in a multicast SID for each next hop node to determine a number of multicast SIDs in each sub-tree associated with the each next hop node; and generating the downstream segment list including only multicast SIDs associated with the sub-tree for the next hop node associated with the downstream interface.

Optionally, in any of the preceding aspects, another implementation of the aspect provides, wherein determining the second downstream segment list comprises generating the second downstream list including only multicast SIDs associated with the second sub-tree for the second downstream interface based on the number of branches indicated in the destination address and the number of SIDs in the multicast SID for each next hop node.

Optionally, in any of the preceding aspects, another implementation of the aspect provides, wherein the transit node does not store a state for the SR P2MP path.

Optionally, in any of the preceding aspects, another implementation of the aspect provides, wherein replacing the upstream segment list with the downstream segment list further comprises setting a multicast SID of a next hop along the sub-tree for the downstream interface as a destination address of the packet.

In an embodiment, the disclosure includes a non-transitory computer readable medium comprising a computer program product for use by a first node in a network, the computer program product comprising computer executable instructions stored on the non-transitory computer readable medium such that when executed by a processor cause the first node to perform the method of any of the preceding aspects.

In an embodiment, the disclosure includes an ingress node in a network, the node comprising: a receiving means for receiving a packet; a processing means for pushing a segment list describing a SR P2MP path onto the packet; and a transmitting means for transmitting the packet on a downstream interface along the SR P2MP path.

SR is a routing protocol that supports routing without maintaining states across a network. Specifically, SR employs segment lists to describe a path. In P2P routing, the segment list is implemented as a stack of labels or SIDs that describe segments of the path. A packet is encapsulated with the segment list. Each node in a path can pop the top label from the packet and forward the packet according to the next label in the stack. In this way, the only node that maintains a state is the ingress node. Transit nodes and egress nodes forward packets based on the label stack, and hence the SR protocol is stateless over the core network. SR works well for P2P paths, but is not designed to support P2MP paths. For example, routing protocols that support P2MP paths are stateful, and hence do not integrate with the stateless approach used in SR. For example, some routing protocols compute a P2MP path and create states at each node to support forwarding along the P2MP path.

The present aspect includes a SR based mechanism for creating and maintaining P2MP paths in a stateless manner through an IPv6 network. An ingress node can create a segment list that describes a P2MP path through the network. The segment list contains multicast SIDs of nodes in the P2MP path. The multicast SIDs can identify the nodes and/or can identify links/interfaces for the nodes, depending on the example. The multicast SIDs contain a number of branches field and a number of SIDs field. The number of branches indicates the number of segments of the P2MP path that extend downstream from the corresponding node. The number of SIDs indicate the number of multicast nodes contained in the P2MP path downstream of the corresponding node. Such information can be pushed onto a packet by an ingress node via encapsulation. The packet can then be transmitted downstream for duplication and/or routing along the P2MP path as indicated. For example, each current node (e.g., ingress and transit nodes) can duplicate the packet a number of times equal to the branches indicated by the number of branches for the multicast SID indicated for the current node. The current node can then encapsulate each packet with a segment list that describes the sub-tree of the P2MP path downstream from the current node along the corresponding branch prior to forwarding the packet. The multicast SID for the next hop node and associated parameters can be included in the destination address for the packet, and the address for the current node can be included in the source address. This allows for the creation of stateless P2MP communication across an IPv6 network via SR. As such, the described examples create additional functionality for nodes in a IPv6 core network. Further, the described examples remove the need to maintain states in the core network, and hence reduces memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, wherein the receiving means, processing means, and transmitting means are configured to perform the method of any of the preceding aspects.

In an embodiment, the disclosure includes a transit node in a network, the node comprising: a receiving means for receiving a packet comprising an upstream segment list describing one or more sub-trees of a SR P2MP path; a processing means for: determining, based on the upstream segment list, a downstream segment list describing a sub-tree for a downstream interface of the transit node included in the SR P2MP path; and replacing the upstream segment list associated with the packet with the downstream segment list; a transmitting means for transmitting the packet on the downstream interface along the SR P2MP path.

SR is a routing protocol that supports routing without maintaining states across a network. Specifically, SR employs segment lists to describe a path. In P2P routing, the segment list is implemented as a stack of labels or SIDs that describe segments of the path. A packet is encapsulated with the segment list. Each node in a path can pop the top label from the packet and forward the packet according to the next label in the stack. In this way, the only node that maintains a state is the ingress node. Transit nodes and egress nodes forward packets based on the label stack, and hence the SR protocol is stateless over the core network. SR works well for P2P paths, but is not designed to support P2MP paths. For example, routing protocols that support P2MP paths are stateful, and hence do not integrate with the stateless approach used in SR. For example, some routing protocols compute a P2MP path and create states at each node to support forwarding along the P2MP path.

The present aspect includes a SR based mechanism for creating and maintaining P2MP paths in a stateless manner through an IPv6 network. An ingress node can create a segment list that describes a P2MP path through the network. The segment list contains multicast SIDs of nodes in the P2MP path. The multicast SIDs can identify the nodes and/or can identify links/interfaces for the nodes, depending on the example. The multicast SIDs contain a number of branches field and a number of SIDs field. The number of branches indicates the number of segments of the P2MP path that extend downstream from the corresponding node. The number of SIDs indicate the number of multicast nodes contained in the P2MP path downstream of the corresponding node. Such information can be pushed onto a packet by an ingress node via encapsulation. The packet can then be transmitted downstream for duplication and/or routing along the P2MP path as indicated. For example, each current node (e.g., ingress and transit nodes) can duplicate the packet a number of times equal to the branches indicated by the number of branches for the multicast SID indicated for the current node. The current node can then encapsulate each packet with a segment list that describes the sub-tree of the P2MP path downstream from the current node along the corresponding branch prior to forwarding the packet. The multicast SID for the next hop node and associated parameters can be included in the destination address for the packet, and the address for the current node can be included in the source address. This allows for the creation of stateless P2MP communication across an IPv6 network via SR. As such, the described examples create additional functionality for nodes in a IPv6 core network. Further, the described examples remove the need to maintain states in the core network, and hence reduces memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, wherein the receiving means, processing means, and transmitting means are configured to perform the method of any of the preceding aspects.

In an embodiment, the disclosure includes an ingress node in a network comprising: a receiver configured to receive a packet; a processor configured to push a segment list describing a SR P2MP path onto the packet; and a transmitter configured to transmit the packet on a downstream interface along the SR P2MP path.

SR is a routing protocol that supports routing without maintaining states across a network. Specifically, SR employs segment lists to describe a path. In P2P routing, the segment list is implemented as a stack of labels or SIDs that describe segments of the path. A packet is encapsulated with the segment list. Each node in a path can pop the top label from the packet and forward the packet according to the next label in the stack. In this way, the only node that maintains a state is the ingress node. Transit nodes and egress nodes forward packets based on the label stack, and hence the SR protocol is stateless over the core network. SR works well for P2P paths, but is not designed to support P2MP paths. For example, routing protocols that support P2MP paths are stateful, and hence do not integrate with the stateless approach used in SR. For example, some routing protocols compute a P2MP path and create states at each node to support forwarding along the P2MP path.

The present aspect includes a SR based mechanism for creating and maintaining P2MP paths in a stateless manner through an IPv6 network. An ingress node can create a segment list that describes a P2MP path through the network. The segment list contains multicast SIDs of nodes in the P2MP path. The multicast SIDs can identify the nodes and/or can identify links/interfaces for the nodes, depending on the example. The multicast SIDs contain a number of branches field and a number of SIDs field. The number of branches indicates the number of segments of the P2MP path that extend downstream from the corresponding node. The number of SIDs indicate the number of multicast nodes contained in the P2MP path downstream of the corresponding node. Such information can be pushed onto a packet by an ingress node via encapsulation. The packet can then be transmitted downstream for duplication and/or routing along the P2MP path as indicated. For example, each current node (e.g., ingress and transit nodes) can duplicate the packet a number of times equal to the branches indicated by the number of branches for the multicast SID indicated for the current node. The current node can then encapsulate each packet with a segment list that describes the sub-tree of the P2MP path downstream from the current node along the corresponding branch prior to forwarding the packet. The multicast SID for the next hop node and associated parameters can be included in the destination address for the packet, and the address for the current node can be included in the source address. This allows for the creation of stateless P2MP communication across an IPv6 network via SR. As such, the described examples create additional functionality for nodes in a IPv6 core network. Further, the described examples remove the need to maintain states in the core network, and hence reduces memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, wherein the transmitter is further configured to transmit a copy of the packet on a different downstream interface than the packet, wherein the copy of the packet comprises a second segment list, and wherein the segment list and the second segment list describe different sub-trees of the SR P2MP path.

Optionally, in any of the preceding aspects, another implementation of the aspect provides, wherein the SR P2MP path is stateless across the network.

Optionally, in any of the preceding aspects, another implementation of the aspect provides, wherein pushing the segment list onto the packet further comprises setting a multicast segment identifier (SID) of a next hop along a sub-tree of the SR P2MP path as a destination address of the packet.

Optionally, in any of the preceding aspects, another implementation of the aspect provides, wherein the segment list comprises multicast SIDs of each node or each link in the sub-tree of the SR P2MP path.

Optionally, in any of the preceding aspects, another implementation of the aspect provides, wherein each multicast SID comprises a multicast block prefix, a node identifier, and arguments.

Optionally, in any of the preceding aspects, another implementation of the aspect provides, wherein each multicast SID comprises a multicast adjacency SID locator, a link number, and arguments.

Optionally, in any of the preceding aspects, another implementation of the aspect provides, wherein the arguments comprise a number of branches of the sub-tree that are associated with a corresponding node.

Optionally, in any of the preceding aspects, another implementation of the aspect provides, wherein the arguments further comprise a number of SIDs included in the sub-tree downstream of the corresponding node.

In an embodiment, the disclosure includes a transit node comprising: a receiver configured to receive a packet comprising an upstream segment list describing one or more sub-trees of a SR P2MP path passing through the transit node; a processor configured to: determine, based on the upstream segment list, a downstream segment list describing a sub-tree for a downstream interface of the transit node included in the SR P2MP path; and replace the upstream segment list associated with the packet with the downstream segment list; and a transmitter configured to transmit the packet on the downstream interface along the SR P2MP path.

SR is a routing protocol that supports routing without maintaining states across a network. Specifically, SR employs segment lists to describe a path. In P2P routing, the segment list is implemented as a stack of labels or SIDs that describe segments of the path. A packet is encapsulated with the segment list. Each node in a path can pop the top label from the packet and forward the packet according to the next label in the stack. In this way, the only node that maintains a state is the ingress node. Transit nodes and egress nodes forward packets based on the label stack, and hence the SR protocol is stateless over the core network. SR works well for P2P paths, but is not designed to support P2MP paths. For example, routing protocols that support P2MP paths are stateful, and hence do not integrate with the stateless approach used in SR. For example, some routing protocols compute a P2MP path and create states at each node to support forwarding along the P2MP path.

The present aspect includes a SR based mechanism for creating and maintaining P2MP paths in a stateless manner through an IPv6 network. An ingress node can create a segment list that describes a P2MP path through the network. The segment list contains multicast SIDs of nodes in the P2MP path. The multicast SIDs can identify the nodes and/or can identify links/interfaces for the nodes, depending on the example. The multicast SIDs contain a number of branches field and a number of SIDs field. The number of branches indicates the number of segments of the P2MP path that extend downstream from the corresponding node. The number of SIDs indicate the number of multicast nodes contained in the P2MP path downstream of the corresponding node. Such information can be pushed onto a packet by an ingress node via encapsulation. The packet can then be transmitted downstream for duplication and/or routing along the P2MP path as indicated. For example, each current node (e.g., ingress and transit nodes) can duplicate the packet a number of times equal to the branches indicated by the number of branches for the multicast SID indicated for the current node. The current node can then encapsulate each packet with a segment list that describes the sub-tree of the P2MP path downstream from the current node along the corresponding branch prior to forwarding the packet. The multicast SID for the next hop node and associated parameters can be included in the destination address for the packet, and the address for the current node can be included in the source address. This allows for the creation of stateless P2MP communication across an IPv6 network via SR. As such, the described examples create additional functionality for nodes in a IPv6 core network. Further, the described examples remove the need to maintain states in the core network, and hence reduces memory and processor resource usage across the core network as the number of P2MP paths scale up. Hence, the described examples solve various problems specific to network communications and increase the functionality and/or operability of network communication devices.

Optionally, in any of the preceding aspects, another implementation of the aspect provides, wherein the processor is further configured to duplicate the packet to generate a copy of the packet for transmission on a second downstream interface of the transit node; determine, based on the upstream segment list, a second downstream segment list describing a second sub-tree for the second downstream interface included in the SR P2MP path; and replace the upstream segment list associated with the copy of the packet with the second downstream segment list, and wherein the transmitter is further configured to transmit the copy of the packet on the second downstream interface along the SR P2MP path.

Optionally, in any of the preceding aspects, another implementation of the aspect provides, wherein replacing the upstream segment list with the second downstream segment list includes duplicating the packet containing the upstream segment list and then replacing the upstream segment list with the second downstream segment list in the copy of the packet.

Optionally, in any of the preceding aspects, another implementation of the aspect provides, wherein replacing the upstream segment list with the second downstream segment list includes removing the upstream segment list from the packet prior to duplication and pushing the second downstream segment list onto the copy of the packet.

Optionally, in any of the preceding aspects, another implementation of the aspect provides, wherein the packet, as received, contains a destination address identifying the transit node, and wherein the destination address includes arguments comprising a number of branches associated with the transit node.

Optionally, in any of the preceding aspects, another implementation of the aspect provides, wherein the upstream segment list comprises multicast SIDs of each node or each link in the sub-tree associated with the transit node.

Optionally, in any of the preceding aspects, another implementation of the aspect provides, wherein each multicast SID comprises a number of SIDs included in a sub-tree downstream of the corresponding node.

Optionally, in any of the preceding aspects, another implementation of the aspect provides, wherein determining the downstream segment list comprises: employing the number of branches indicated in the destination address to determine a number of next hop nodes; employing the number of SIDs in a multicast SID for each next hop node to determine a number of multicast SIDs in each sub-tree associated with the each next hop node; and generating the downstream segment list including only multicast SIDs associated with the sub-tree for the next hop node associated with the downstream interface.

Optionally, in any of the preceding aspects, another implementation of the aspect provides, wherein determining the second downstream segment list comprises generating the second downstream list including only multicast SIDs associated with the second sub-tree for the second downstream interface based on the number of branches indicated in the destination address and the number of SIDs in the multicast SID for each next hop node.

Optionally, in any of the preceding aspects, another implementation of the aspect provides, wherein the transit node does not store a state for the SR P2MP path.

Optionally, in any of the preceding aspects, another implementation of the aspect provides, wherein replacing the upstream segment list with the downstream segment list further comprises setting a multicast SID of a next hop along the sub-tree for the downstream interface as a destination address of the packet.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic diagram of an example network node.

FIG. 5 is a schematic diagram of example encodings of segment lists that describe a SR P2MP path in terms of nodes in an IPv6 network.

FIG. 6 is a schematic diagram of an example encoding of a multicast adjacency SID indicating a link in a segment list that describes a SR P2MP path in an IPv6 network.

FIG. 7 is a schematic diagram of an example encoding of a multicast adjacency SID indicating a link and sub-tree information.

FIG. 8 is a schematic diagram of example encodings of a segment list describing a SR P2MP path in terms of links in an IPv6 network.

FIG. 9 is a flowchart of an example method of transmitting packets to an SR P2MP path by an ingress node at the edge of an IPv6 network.

FIG. 10 is a flowchart of an example method of forwarding packets along an SR P2MP path by a transit node in an IPv6 network.

DETAILED DESCRIPTION

Figure 1:
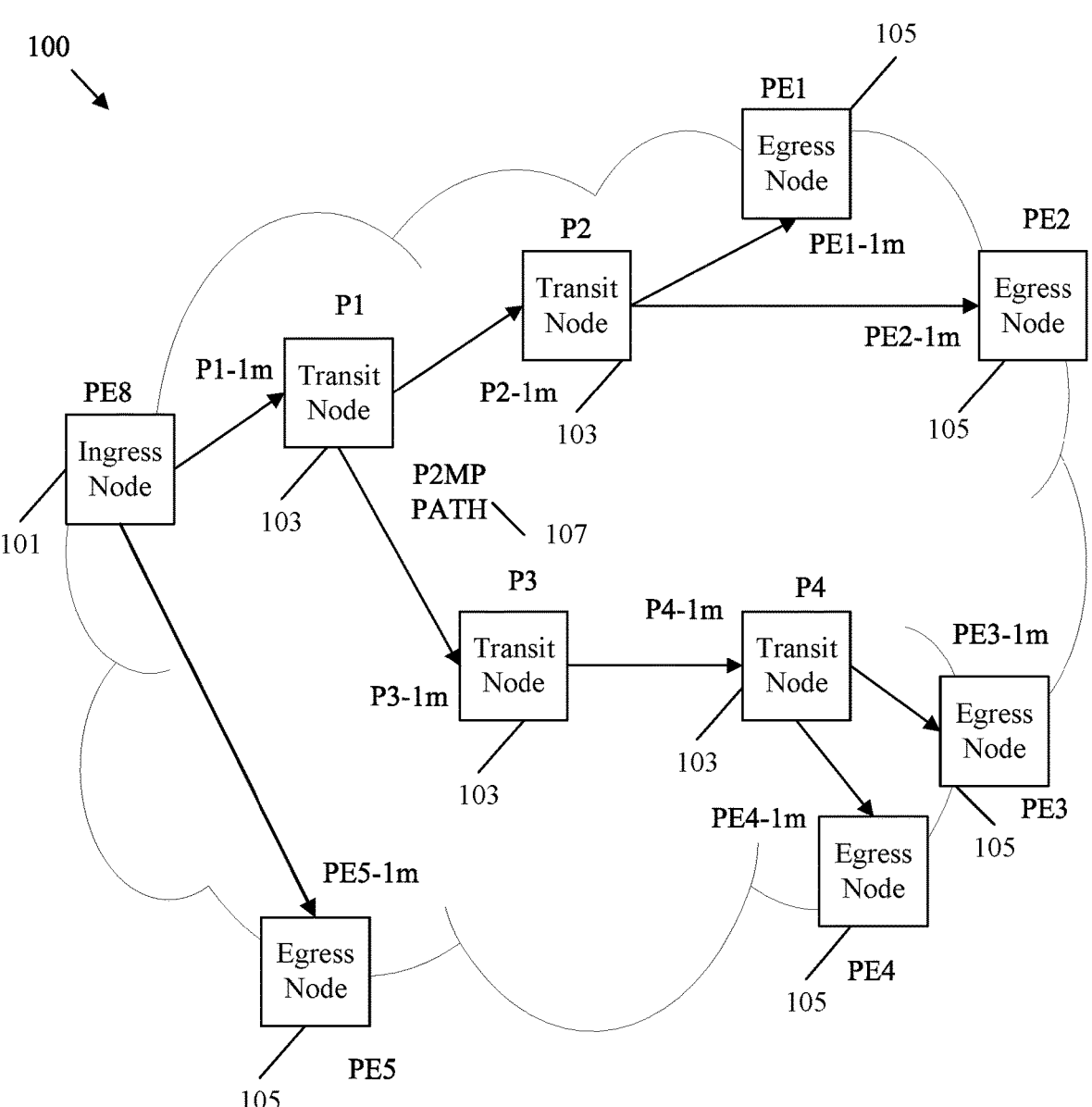
FIG. 1 is a schematic diagram of an example IPv6 network configured to employ SR mechanisms to implement P2MP paths.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A network is a group of connected nodes that communicate using a shared set of communication protocols. An IPv6 network is a network that uses the IPv6 protocol, which is a communication protocol for communicating packets over the Internet using a 128-bit address mechanism. An ingress node is a node positioned at the edge of a network and that provides handling mechanisms to allow a corresponding packet to enter the network. A transit node is a node in a network configured to forward packets according to predetermined protocols. A packet is a data unit sized for routing/switching by a node and organized according to a predetermined format. SR is a routing protocol that operates by encapsulating packets with labels (e.g., a label stack) or segment identifiers (SIDs) that describe a path of segments through a network. A segment list is an ordered description of segments corresponding to a path. An upstream segment list is a segment list included in a packet received from an upstream node. A downstream segment list is a segment list included in a packet prepared for downstream transmission. A P2MP path is a path that proceeds from a single origin to multiple destinations. A downstream interface is a port where a node communicates with a link in a downstream direction relative to a corresponding communication. An upstream interface is a port where a node communicates with a link in an upstream direction relative to a corresponding communication. A copy of a packet is a new packet that is a reproduction of an original packet, where the new packet includes a substantially similar (e.g., identical) payload to the original packet and potentially different routing data.

A tree is a network structure with a single root and multiple leaves connected via a plurality of branches. A sub-tree is a portion of a tree that contains less than all of the elements in the tree. A state is remembered information used for processing data. Stateless is a description of a system that does not use remembered information for processing data. A next hop is a subsequent node in a path. A destination address is information identifying a node and/or link to which a packet is being sent. A multicast SID is an identifier that uniquely identifies a link and/or node as a segment in a multicast communication. A multicast block prefix is a preceding portion of an address that indicates the address is associated with multicast communication. A node identifier is information that indicates a corresponding node. Arguments are parameters that provide supplemental data for use by routing protocols. A multicast adjacency SID locator is an identifier used to indicate a link as a segment in a multicast communication. A link number is data that identifies an interface of a node and/or a link attached to the interface. A number of branches is data that indicates how many branches of a tree/sub-tree extend downstream from a corresponding multicast node. A number of SIDs is data that indicates how many multicast nodes/interfaces are contained in a sub-tree rooted at a corresponding node.

SR is a routing protocol that supports routing without maintaining states across a network. Specifically, SR employs segment lists to describe a path. In point-to-point (P2P) routing, the segment list is implemented as a stack of labels or SIDs that describe segments of the path. A packet is encapsulated with the segment list. Each node in a path can pop the top label from the packet and forward the packet according to the next label in the stack. In this way, the only node that maintains a state is the ingress node. Transit nodes and egress nodes forward packets based on the label stack, and hence the SR protocol is stateless over the core network. SR works well for P2P paths, but is not designed to support P2MP paths. For example, routing protocols that support P2MP paths are stateful, and hence do not integrate with the stateless approach used in SR. For example, some routing protocols compute a P2MP path and create states at each node to support forwarding along the P2MP path.

Disclosed herein is a SR based mechanism for creating and maintaining P2MP paths in a stateless manner through an IPv6 network. An ingress node can create a segment list that describes a P2MP path through the network. The segment list contains multicast SIDs of nodes in the P2MP path. The multicast SIDs can identify the nodes and/or can identify links/interfaces for the nodes, depending on the example. The multicast SIDs contain a number of branches field and a number of SIDs field. The number of branches indicates the number of segments of the P2MP path that extend downstream from the corresponding node. The number of SIDs indicate the number of multicast nodes contained in the P2MP path downstream of the corresponding node. Such information can be pushed onto a packet by an ingress node via encapsulation. The packet can then be transmitted downstream for duplication and/or routing along the P2MP path as indicated. For example, each current node (e.g., ingress and transit nodes) can duplicate the packet a number of times equal to the branches indicated by the number of branches for the multicast SID indicated for the current node. The current node can then encapsulate each packet with a segment list that describes the sub-tree of the P2MP path downstream from the current node along the corresponding branch prior to forwarding the packet. The multicast SID for the next hop node and associated parameters can be included in the destination address for the packet, and the address for the current node can be included in the source address. This allows for the creation of stateless P2MP communication across an IPv6 network via SR. As such, the described examples create additional functionality for nodes in a IPv6 core network. Further, the described examples remove the need to maintain states in the core network, and hence reduces memory and processor resource usage across the core network as the number of P2MP paths scale up. Hence, the described examples solve various problems specific to network communications and increase the functionality and/or operability of network communication devices.

FIG. 1 is a schematic diagram of an example IPv6 network 100 configured to employ SR mechanisms to implement P2MP paths. For example, the network 100 is configured to employ SR protocols. SR is a routing protocol that operates by encapsulating packets with labels or SIDs that describe a path of segments through the network 100. A stack of SIDs that describe a path may be referred to as a segment list. A segment list can be defined as an ordered description of segments corresponding to a path. Encapsulation can be used to append a segment list to the packet (e.g., the front of the packet) so that the packet is routed based on the segment list instead of based on the data in the packet. For example, the nodes of the network 100 are configured to employ encapsulation algorithms to encapsulate packets with SIDs (e.g., push SIDs into the segment list of packets), get the current SID from the segment list of the packets as the packets traverse the network 100, and route the packets according to the SIDs (e.g., the current SID of a segment list). Network 100 is also configured to employ encapsulation and segment lists to implement a P2MP path as described in greater detail below.

The network 100 is an IPv6 network. IPv6 networks communicate by employing the IPv6 protocol. The IPv6 protocol is a communication protocol for communicating packets over the Internet using a 128-bit address mechanism. The network 100 includes an arbitrary number of nodes. Only the relevant nodes are depicted in FIG. 1. The network 100 includes edge nodes and internal nodes. An edge node is any node connected to both the network 100 and some external network or node. An internal node connects only to other nodes in the network 100.

Edge nodes are configured to transition packets from other networks into/out of the network 100, for example by providing network security and/or transitioning between external protocols and protocols used by the network 100. In a path routing context, an edge node can act as either an ingress node 101 or an egress node 105. An ingress node 101 is an edge node that accepts a packet from external source(s) for communication across the network. Hence, an ingress node 101 is a node positioned at the edge of a network 100 and that provides handling mechanisms to allow a corresponding packet to enter the network 100. An egress node 105 is an edge node that accepts packets from within the network 100 and forwards such packets toward destination (s) outside the network 100. The egress node 105 may also transition packets from the protocols used by the network 100 to external protocols.

The network 100 also includes transit nodes 103. A transit node 103 is an internal node in network 100 configured to forward packets according to predetermined protocols. The transit nodes 103 are connected to each other, the ingress node 101, and/or the egress nodes 105 using links. Such links may include optical links, optical electrical links, electrical links, and/or wireless links. Such links connect to the ingress node 101, transit nodes 103, and egress nodes 105 at interfaces. An interface is a port where a node connects to a link. Depending on the example, a node, a node's interface, or both may be assigned addresses to support routing packets. An address is a locally or globally unique set of characters that identifies a corresponding component (e.g., link, node, virtual link, virtual node, etc.) for switching and/or routing purposes.

In the present example, the network 100 includes a P2MP path 107, which is a path that proceeds from a single origin to multiple destinations. Hence, the P2MP path 107 can be used for communicating a stream of packets from a single source (e.g., a point) to multiple destinations (e.g., multiple points). A P2MP path 107 proceeds from a source towards the destinations. From any point along the P2MP path 107, relative direction can be described as upstream or downstream. Upstream is in the direction of the source from the perspective of a current link and/or node. Downstream is in the direction of a destination from the perspective of a current link and/or node. As such, each node includes upstream interface(s) and downstream interface(s). An upstream interface is a port where a node communicates with a link in an upstream direction relative to a corresponding communication. A downstream interface is a port where a node communicates with a link in a downstream direction relative to a corresponding communication.

The P2MP path 107 enters the network 100 at the ingress node 101 on an upstream interface from a source. The ingress node 101 encapsulates packets in the stream with a segment list as described below as well as performs any other protocol translations used to transition packets into network 100. The P2MP path 107 leaves the ingress node 101 on one or more downstream interfaces and proceeds toward the upstream interfaces of the egress nodes 105 associated with various destinations. In some instances, the P2MP path 107 also proceeds to upstream interfaces of transit nodes 103 and through downstream interfaces of such transit nodes 103 toward the egress nodes 105. The egress nodes 105 remove any remaining encapsulation and perform any other relevant protocol translation to transition packets out of the network 100 for transmission toward destinations.

The P2MP path 107 can be described as a tree according to graph theory. A tree is a network structure with a single root and multiple leaves connected via a plurality of branches. Branches are links that proceed downstream from a node and the egress nodes 105 are the leaves. A tree contains sub-trees. A sub-tree is a portion of a tree that contains less than all of the elements in the tree. For example, a portion of a P2MP path 107 that proceeds downstream from a corresponding node (e.g., any node other than the ingress node 101) can be referred to as a sub-tree rooted at the corresponding node.

The P2MP path 107 path operates by causing the ingress node 101 and transit nodes 103 to receive a packet on an upstream interface, copy the packet as desired, and send each packet/packet copy on the downstream interface(s) that branch from the node. As noted above, some networks manage such functionality by storing states in the associated node. A state is remembered information used for processing data. For example, a transit node 103 could receive instructions to perform specific copy and forwarding processes whenever a packet, which is part of an indicated stream, is received. The problem with such an approach is that an increasing number of P2MP paths 107 result in large tables that must be sorted through to obtain proper copying and forwarding instructions. This increases processing resource demand and slows forwarding as the number of P2MP paths 107 in the network 100 increase. Further, the amount of memory in the transit nodes 103 limit the number of P2MP paths 107 that can be setup at any specific point in time. As such, stateful P2MP paths have limited scalability. Further, SR protocols are designed to be stateless. Stateless is a description of a system that does not use remembered information for processing data.

The present disclosure employs mechanisms to create stateless P2MP paths 107 through a network 100. Such mechanisms align with the design principle of SR protocols and allow the number of P2MP paths 107 to be scalable. As such, the network 100 can simultaneously support an arbitrarily large number of stateless P2MP paths 107. As used herein, the mechanisms are stateless because they do not require that a state be maintained in any transit node 103 or egress node 105. The ingress node 101 may still maintain state data for any P2MP path(s) 107 rooted at the ingress node 101.

Stateless forwarding along a P2MP path 107 is performed using a segment list formatted to describe a multicast tree. In some examples, the segment list employs multicast SIDs that indicate each node in the P2MP path 107. In other examples, the segment list employs multicast SIDs that indicate each link in the P2MP path 107. The segment list also contains additional arguments that assist nodes in interpreting the information in the segment list. For each packet in a stream, the ingress node 101 copies the packet as desired and encapsulates the packet(s) by attaching the segment list. The packet(s) is/are forwarded to the transit nodes 103, which copy each received packet when indicated by the segment list, update the segment list based on predefined rules, and forward such packets based on the updated segment list. For example, a transit node 103 may receive a packet from an upstream direction containing an upstream segment list. The transit node 103 may copy the packet as indicated by the upstream segment list and create one or more downstream segment lists based on the upstream segment list. The transit node 103 can then attach the correct downstream segment list to each packet and forward such packets downstream based on the downstream segment list. An upstream segment list is a segment list included in a packet received from an upstream node. A downstream segment list is a segment list included in a packet prepared for downstream transmission. An egress node 105 receiving a packet can remove the segment list along with the encapsulation and forward the packet toward a final destination.

The following example is included to clarify the process of employing a segment list to encode a P2MP path 107. In the present example, ingress node 101 has an address of provider edge (PE)8. The egress nodes 105 have addresses of PE1, PE2, PE3, PE4, and PE5. The transit nodes 103 have addresses of provider node (P)1, P2, P3, and P4. Interfaces of such node can be specifically addressed by a link number that specifies the interfaces connected to that link. For example, a first interface may be denoted as -1 multicast(m), a second interface may be denoted as -2$m$, etc. As such, a first interface on node P1 can be denoted as P1-1$m$, a first interface on node PE4 can be denoted as PE4-1$m$, etc. In an operating system, such addresses can be replaced by locally significant and/or globally significant numerical values.

In the present example, the ingress node 101 (node PE8) receives a packet associated with the P2MP path 107. The P2MP path 107 has two branches from PE8, and therefore PE2 makes a copy of the packet. One packet is encapsulated with a segment list that describes the sub-tree rooted at PE8 that extends to PE5. In the present example, the sub-tree that extends from PE8 to PE5 is a single link. In some examples, such a segment list contains a multicast SID of PE5. However, since there is a single link/path with no branches between the ingress node 101 (PE8) and the egress node (PE5), such a segment list may optionally be formatted as SIDs describing the path from PE8 to PE5 according to general SR protocols. For example, a multicast SID indicating PE5 and/or PE5-1$m$ can be set as the destination address of the packet. The segment list may be empty or omitted. The packet can then be transmitted to PE5 for decapsulation and forwarding toward a destination.

The other packet is encapsulated with a segment list that describes the sub-tree rooted at PE8 that extends toward PE1-PE4. For example, the segment list may contain a multicast SID for links/nodes in the sub-tree and arguments for each multicast SID. Such arguments may include a number of P2MP path 107 branches extending from the node indicated by the multicast SID. Such arguments may also include a number of multicast SIDs downstream from the node/link associated with the multicast SID. In an example, the multicast SID of the next hop node along the corresponding branch, in this case P1 and/or P1-1$m$, is set as the destination address for the packet destined to leave PE8 for P1. Multicast SIDs for the remaining nodes in the sub-tree are included in the segment list, in this case P2, P3, PE1, PE2, P4, PE3, and PE4 (or P2-1$m$, P3-1$m$, PE1-1$m$, PE2-1$m$, P4-1$m$, PE3-1$m$, and PE4-1$m$ if interface addresses are used). The packet is then forwarded from PE8 to P1.

The packet is received at P1 and contains a segment list received from an upstream node. This is referred to herein as an upstream segment list for clarity of discussion. Accordingly, an upstream segment list is a segment list included in a packet received from an upstream node. The transit node 103 denoted as P1 creates one or more downstream segment lists for the packet based on the upstream destination address and the upstream segment list and forwards the packet based on the downstream segment list(s). A downstream segment list is a segment list included in a packet prepared for downstream transmission. In the present example, the upstream destination address includes arguments indicating the P2MP path 107 includes two branches downstream from P1. Hence, the packet is duplicated to create two copies of the packet, resulting in one packet for each branch. P1 then obtains the first two multicast SIDs from the segment list based on the number of branches in the upstream destination address. Specifically, P1 obtains the first multicast SID from the segment list, in this case P2 or P2-1$m$, and includes that value as the downstream destination address for the packet assigned for communication from P1 to P2. P1 obtains the second multicast SID from the segment list, in this case P3 or P3-1$m$, and includes that value as the downstream destination address for the packet assigned for communication from P1 to P3. As there are only two branches from P1 as indicated by the upstream destination address, P1 determines that the remaining multicast SIDs in the segment list are part of further sub-trees associated with P2 and P3. For example, P1 can determine that there are two multicast SIDs downstream from P2 and three multicast SIDs downstream from P3 based on the number of SIDs argument in the multicast SID for P2 and P3, respectively. Hence, the first two multicast SIDs after the downstream destination addresses (e.g., PE1/PE1-1$m$ and PE2/PE2-1$m$) are included in a downstream segment list attached to the packet proceeding from P1 to P2. P3 is associated with three downstream multicast SIDs, and hence the next three multicast SIDs from the upstream segment list (e.g., P4/P4-1$m$, PE3/PE3-1$m$, and PE4/PE4-1$m$) are included in the downstream segment list attached to the packet proceeding from P1 to P3.

In this way, the segment list is rewritten at each current hop to include only multicast SIDs of nodes/links that are downstream from the current hop via a corresponding downstream branch of the P2MP path 107. In some examples, the upstream segment list is removed prior to copying the packet and then the downstream segment list(s) are generated based on the upstream list and pushed onto the corresponding packet(s). In other examples, the packet is copied while containing the upstream segment list. The upstream segment list in each packet is then replaced by the corresponding downstream segment lists. Complete example encodings of the segment list and corresponding descriptions are included in more detail herein below. Once the packets are received at the egress nodes 105 of the P2MP path 107, such packets may contain empty segment lists. Further, the destination addresses of such packets may indicate that zero branches extend from the corresponding node and zero multicast SIDs downstream from the corresponding node. Using this information, an egress node 105 can determine the packet should be transitioned out of the network 100. The egress node 105 can decapsulate the packet to remove the segment list and forward the packet toward a final destination based on the data contained in the decapsulated packet.

Using the preceding mechanism, packets can be forwarded along a P2MP path 107 without employing a state at either the transit nodes 103 or the egress nodes 105. As such, the disclosed mechanisms allow the creation of P2MP paths 107 in a way that is both scalable and consistent with the SR protocol.

FIG. 2 is a schematic diagram of an example network node 200 for operation in an IPv6 network, such as a node in network 100. For example, network node 200 can be employed to implement an ingress node 101, a transit node 103, and/or an egress node 105. Hence, the network node 200 is suitable for implementing the disclosed examples/embodiments as described herein. The network node 200 comprises downstream ports 220, upstream ports 250, and/or transceiver units (Tx/Rx) 210, including transmitters and/or receivers for communicating data upstream and/or downstream over a network. It should be noted that a Tx/Rx 210 may be implemented as a receiver, receiver circuitry, a transmitter, transmitter circuitry, or combinations thereof. The network node 200 also includes a processor 230 including a logic unit and/or central processing unit (CPU) to process the data and a memory 232 for storing the data. The network node 200 may also comprise optical-to-electrical (OE) components, electrical-to-optical (EO) components, and/or wireless communication components coupled to the upstream ports 250 and/or downstream ports 220 for communication of data via electrical, optical, and/or wireless communication networks.

The processor 230 is implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs). The processor 230 is in communication with the downstream ports 220, Tx/Rx 210, upstream ports 250, and memory 232. The processor 230 comprises a P2MP module 214. The P2MP module 214 implements the disclosed embodiments described herein. Specifically, the P2MP module 214 may maintain SR P2MP paths in an IPv6 network by using corresponding segment lists containing multicast SIDs, multicast adjacency SID locators, and/or corresponding sub-tree information. For example, the P2MP module 214 may receive a packet, read a segment list from the packet, duplicate the packet, push segment list(s) onto the packet(s) describing downstream sub-tree(s), and/or forward such packet(s) for transit across an IPv6 network. Accordingly, the P2MP module 214 may be configured to perform mechanisms to address one or more of the problems discussed above. As such, the P2MP module 214 improves the functionality of the network node 200 as well as addresses problems that are specific to the network communication arts. Further, P2MP module 214 effects a transformation of the network node 200 to a different state. Alternatively, the P2MP module 214 can be implemented as instructions stored in the memory 232 and executed by the processor 230 (e.g., as a computer program product stored on a non-transitory medium).

The memory 232 comprises one or more memory types such as disks, tape drives, solid-state drives, read only memory (ROM), random access memory (RAM), flash memory, ternary content-addressable memory (TCAM), static random-access memory (SRAM), etc. The memory 232 may be used as an over-flow data storage device, to store programs when such programs are selected for execution, and to store instructions and data that are read during program execution.

Figure 3:
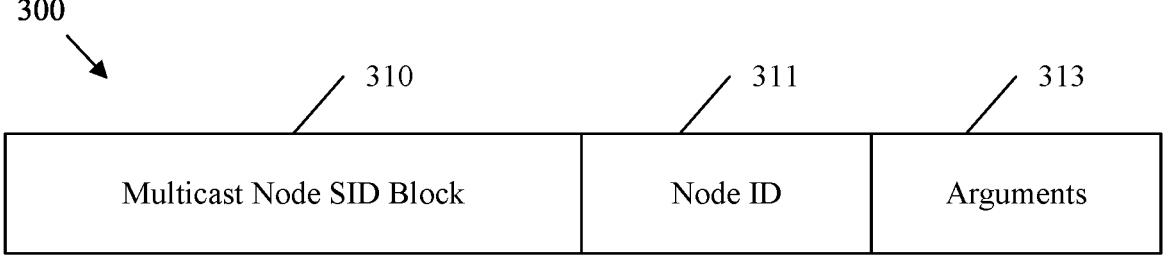
FIG. 3 is a schematic diagram of an example encoding of a multicast segment identifier (SID) indicating a node in a segment list that describes a SR P2MP path in an IPv6 network.

FIG. 3 is a schematic diagram of an example encoding of a multicast SID 300 indicating a node, such as a network node 200, in a segment list that describes a SR P2MP path in an IPv6 network, such as P2MP path 107 in a network 100. The multicast SID 300 may be globally unique across a network domain, and hence may uniquely identify a node from any other node in the network domain. In one example, a network administrator may configure the multicast SID 300 for every node. In another example, a central controller may allocate a multicast SID 300 for each node and send information indicating the multicast SID to each corresponding node. In either case, the nodes may each distribute their own multicast SID 300 across the network domain.

The multicast SID 300 includes a multicast SID block 310, a node ID 311, and arguments 313. The multicast SID 300 may be 128 bits long to support an IPv6 addressing system. The multicast SID block 310 comprises a common prefix allocated for use by multicast node SIDs. For example, the multicast SID block 310 may be employed to indicate that the address included in the multicast SID 300 is an address that is used to represent a P2MP path. The multicast SID block 310 may be a number of bits (B) long. The node ID 311 comprises a node identifier (ID). The node ID may be globally unique across the network domain and may indicate a specific node. The node ID 311 may be a number of bits (N) long, where N+B is less than 128 bits. In one example, an open shortest path first (OSPF) router ID that identifies the node for an OSPF routing protocol can be used as the node ID 311. In such a case, the node ID 311 is thirty-two bits long. In another example, a unique number from 1 to n is assigned to each of the n nodes in the network domain and the number can be used as the node ID 311. The arguments 313 are parameters used to support additional functionality as described in more detail below. The arguments 313 may be less than or equal to 128 bits minus N bits and minus B bits.

Figure 4:
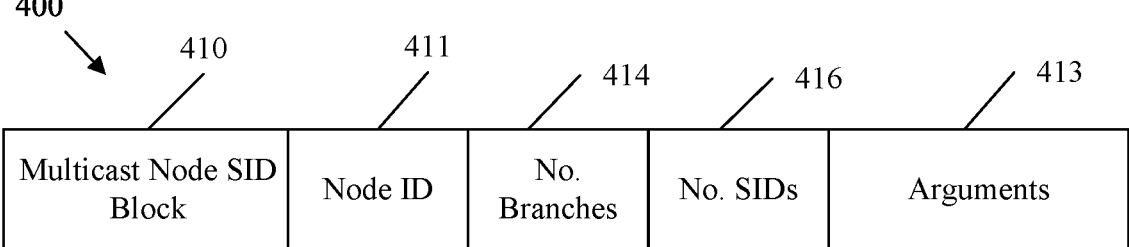
FIG. 4 is a schematic diagram of an example encoding of a multicast SID indicating a node and sub-tree information.

FIG. 4 is a schematic diagram of an example encoding of a multicast SID 400 indicating a node and sub-tree information. Multicast SID 400 is an example implementation of multicast SID 300. Hence, multicast SID 400 may be used to uniquely identify a network node, such as network node 200, positioned along a P2MP path in an IPv6 network, such as P2MP path 107 in a network 100. The multicast SID 400 comprises a multicast SID block 410, a node ID 411, and arguments 413, which are substantially similar to the multicast SID block 310, the node ID 311, and the arguments 313, respectively. For example, the multicast SID block 410 extends from bit zero to a bit B, the node ID 411 extends from bit B to bit N+B, and the arguments extend from bit N+B to bit 127, resulting in a 128 bit address.

The arguments 413 further comprise a number of branches 414 and a number of SIDs 416. The number of branches 414 is data that indicates a number of branches of a tree/sub-tree that extend downstream from a corresponding multicast node with an address designated by the multicast SID block 410 and the node ID 411. As such, the number of branches 414 includes the number of outgoing interfaces or branches along the multicast tree from the node associated with the multicast SID 400. Accordingly, when a node receives the node's multicast SID 400 in a packet transported by an SR P2MP path or tree, the multicast SID 400 comprises the number of outgoing interfaces or branches along the P2MP path or tree from the node. The number of branches 414 may be considered to be part of the arguments 413 and may extend from bit N+B.

The number of SIDs 416 is data that indicates a number of multicast nodes contained in a sub-tree rooted at a corresponding multicast node with an address designated by the multicast SID block 410 and the node ID 411. The number of SIDs 416 may be considered part of the arguments 413 and may extend from a bit following the number of branches 414. Any bits after the number of SIDs 416 in the arguments 413 may be reserved for other purposes.

FIG. 5 is a schematic diagram of example encodings of segment lists 500 and 501 that describe a SR P2MP path in terms of nodes in an IPv6 network. Specifically, segment list 500 and segment list 501 describe the P2MP path 107 in network 100. The segment lists 500 and 501 employ multicast SIDs 300 and/or 400 to address nodes, such as node 200, in the P2MP path 107.

Segment list 501 describes the sub-tree of the P2MP path 107 between node PE8 and node PE5, while segment list 500 describes the sub-tree of the P2MP path 107 between node PE8 and nodes PE1 through PE4. The segment lists 500 and 501 each comprise a multicast node SID column 510, a node ID column 511, a number of branches column 514, a number of SIDs column 516, and an arguments column 513. Each entry of the segment list 500 and/or 501 contains a multicast SID, such as a multicast SID 400. As such, the multicast node SID column 510, the node ID column 511, the number of branches column 514, the number of SIDs column 516, and the arguments column 513 contain entries including multicast SID blocks 410, node IDs 411, number of branches 414, number of SIDs 416, and arguments 413, respectively, from multicast SIDs 400 contained in the segment list 500 and/or 501.

As shown in FIG. 1, the P2MP path 107 includes a sub-tree of a single link from node PE8 to node PE5. As such, a segment list 501, as shown in FIG. 5, describing the sub-tree between node PE8 and node PE5 contains a single multicast SID indicating PE5 as the destination. Specifically, segment list 501 contains a single entry with a single multicast SID. The multicast SID includes a multicast node SID block indicating that the address is used to represent a P2MP path. The multicast SID also includes a node ID set to PE5, which indicates that node PE5 is the next hop along the corresponding branch of the P2MP path 107. The multicast SID for node PE5 contains arguments including a number of branches set to zero and a number of SIDs set to zero. This indicates that no branches of the P2MP path 107 extend beyond node PE5 and no further multicast SIDs are downstream of node PE5. Either argument provides enough information to infer that node PE5 is an egress node 105 that terminates a corresponding branch of the P2MP path 107. Hence, no further multicast SIDs are present in the segment list 501. As such, an ingress node 101 may include the multicast SID for node PE5 in the destination address of a corresponding packet and remove the multicast SID for node PE5 from the segment list 501. In some examples, a corresponding packet can be transmitted to node PE5 with an empty segment list 501. In other examples, the ingress node 101 may omit segment list 501 and employ an SR protocol label stack instead of segment list 501.

Segment list 500 describes the sub-tree of the P2MP path 107 between node PE8 and nodes PE1 through PE4. An ingress node 101 employing two downstream branches, and hence two segment lists 500 and 501, copies an incoming packet, pushes segment list 500 on one copy of the packet, and pushes segment list 501 on the other copy of the packet. The next hop node along the branch between node PE8 and nodes PE1 through PE4 is node P1. Hence, the first entry in segment list 500 contains the multicast SID for node P1. The multicast SID for node P1 includes a number of branches set to two, which indicates P1 includes two downstream branches. The multicast SID for node P1 also includes a number of SIDs set to seven, which indicates seven nodes are downstream from node P1 (P2, P3, PE1, PE2, P4, PE3, and PE4). Accordingly, there are seven entries in the segment list after the multicast SID for node P1. Such entries are included in a predetermined order to allow downstream nodes to determine which nodes are associated with each sub-tree. The ingress node 101 includes such multicast SIDs in the segment list 500 so that such addresses can be interpreted by downstream nodes as discussed below. The first entry of the segment list 500 can be included as the destination address for the corresponding packet, removed from the segment list 500, and the remaining segment list 500 can be pushed onto the packet via encapsulation.

The packet is sent to node P1 as P1 is the destination address. The destination address includes an argument indicating that node P1 contains two downstream branches. Hence, the packet is copied at node P1 to create two packets based on the destination address from the upstream packet. Two branches from the upstream destination address indicates that the first two multicast SIDs remaining in segment list 500 are the next hops along the two branches. Hence, a first downstream segment list is created containing the multicast SID for node P2, and a second downstream segment list is created containing the multicast SID for node P3. The multicast SID for node P2 indicates there are two multicast SIDs downstream of node P1 along the branch extending between node P1 and node P2. Accordingly, the first two multicast SIDs after the node P3 (PE1 and PE2) are included in the segment list and the multicast SID for node P2 is set as the destination address for the packet assigned for communication from node P1 to node P2. Likewise, the multicast SID for node P3 indicates that there are three multicast SIDs downstream from node P3. A segment list is created for the packet allocated for transmission from node P1 to node P3. The multicast SID for node P3 is set as the destination address for such a packet and the three multicast SIDs positioned after the P2 branch data are included in the segment list for the packet to be transmitted toward node P3 (based on the three value of number of SIDs in the multicast SID for node P3). The packets with the two different segment lists are then forwarded downstream from node P1 toward node P2 and node P3.

When the corresponding packet is received at node P2, the number of branches in the destination address is determined to be two based on the arguments in the multicast SID for node P2. Hence, the packet is copied. The upstream segment list received at node P2 contains only two entries (PE1 and PE2) and the upstream destination address indicates only two branches. Hence, node P2 can determine that the multicast SID for node PE1 and the multicast SID for node PE2 should be set as the destination addresses for the respective copies of the packet. Since the multicast SID for node PE1 includes an argument indicating the number of multicast SIDs downstream from node PE1 is zero, node P2 can include an empty segment list in the packet allocated for transmission from node P2 to node PE1. Likewise, since the multicast SID for node PE2 includes an argument indicating the number of multicast SIDs downstream from node PE2 is zero, node P2 can include an empty segment list in the packet allocated for transmission from node P2 to node PE2. When such packets are received at nodes PE1 and PE2, the empty segment lists and/or the number of SIDs set to zero in the corresponding destination addresses allow nodes PE1 and PE2 to determine that the corresponding packets can be decapsulated and forwarded toward their respective destinations.

The packet received at node P3 contains a destination address set to the multicast SID for node P3 and contains a segment list containing the last three entries of segment list 500 (P4, PE3, and PE4). The upstream destination address (the multicast SID for node P3) indicates that there is only one branch downstream of node P3, and hence the packet is not copied. Since there is no branch, the first multicast SID (indicating node P4) is popped from the upstream segment list and set as the downstream destination address for the packet. This results in a downstream segment list that contains the final two entries of segment list 500 (PE3 and PE4). The packet is then forwarded from node P3 to node P4 based on the downstream destination address.

The packet received at node P4 contains a destination address set to the multicast SID for node P4 and contains a segment list containing the last two entries of segment list 500 (PE3 and PE4). The multicast SID for node P4 indicates there are two branches downstream from node P4, and hence the packet is copied. Since the number of branches equals the number of SIDs downstream from node P4 as indicated in the upstream destination address (and since the number of remaining entries in the segment list is equal to the number of branches), node P4 can determine that nodes PE3 and PE4 are egress nodes. Hence, node P4 can determine that node PE3 and node PE4 should be set as the destination addresses for the respective copies of the packet. Since the multicast SID for node PE3 includes an argument indicating the number of multicast SIDs downstream from node PE3 is zero, node P4 can include an empty segment list (or no segment list) in the packet allocated for transmission from node P4 to node PE3. Likewise, since the multicast SID for node PE4 includes an argument indicating the number of multicast SIDs downstream from node PE4 is zero, node P4 can include an empty segment list in the packet allocated for transmission from node P4 to node PE4. When such packets are received at nodes PE3 and PE4, the empty segment lists and/or the number of SIDs set to zero in the corresponding destination addresses allow nodes PE3 and PE4 to determine that the corresponding packets can be decapsulated and forwarded toward their respective destinations.

As described above, each node along a P2MP path can read a segment list 500 and/or 501 containing multicast SIDs (or portions thereof) as well as multicast SIDs in packet destination addresses to correctly copy packets from a stream and create new segment lists for use in handling such packets by downstream nodes. In this way, a packet can be transmitted from a single point to multiple destinations in a stateless manner.

Figures 6, 7:
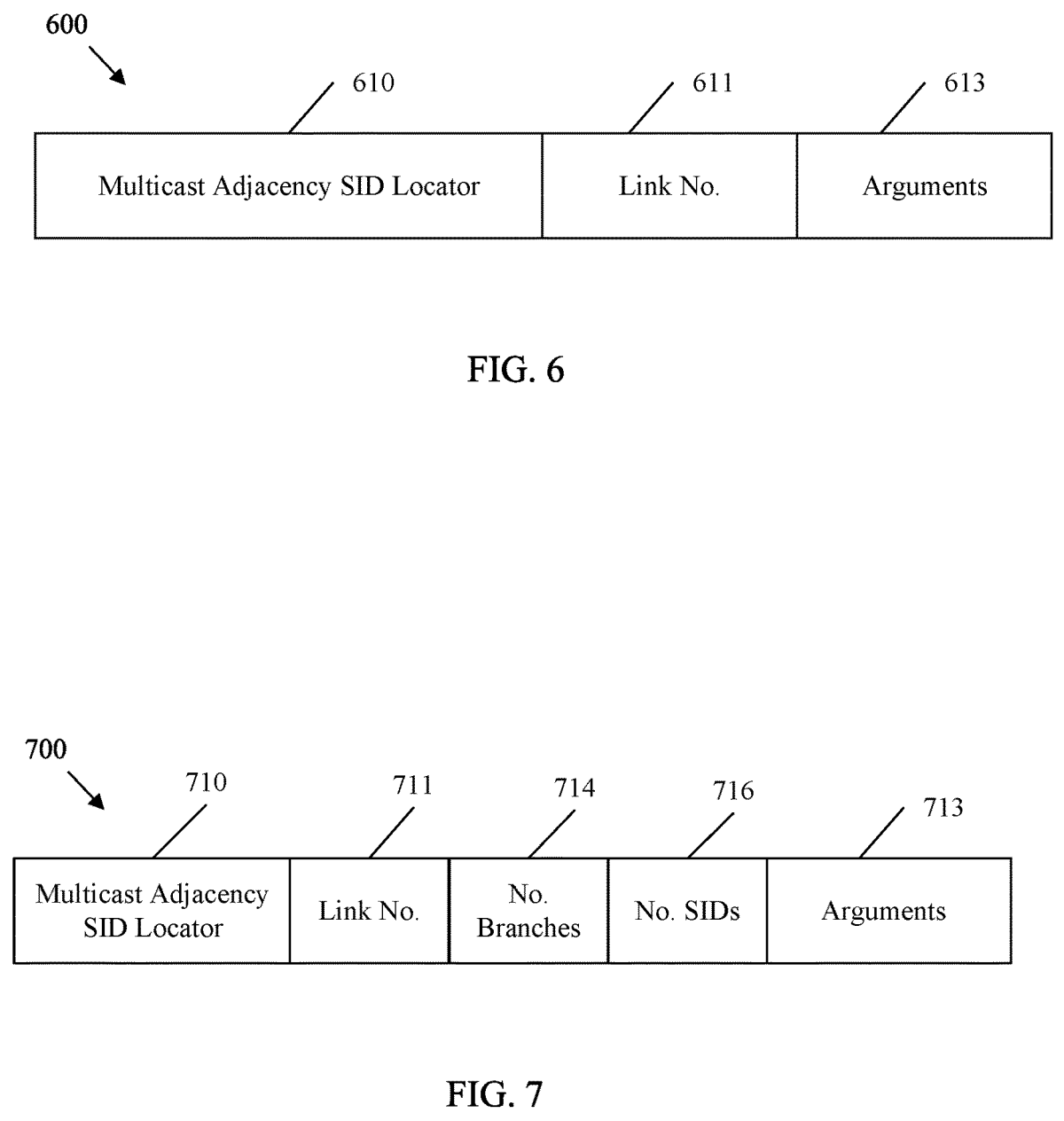

FIG. 6 is a schematic diagram of an example encoding of a multicast adjacency SID 600 indicating a link, for example by an interface of a network node 200 connected to the link, in a segment list that describes a SR P2MP path in an IPv6 network, such as P2MP path 107 in a network 100. The multicast adjacency SID 600 may be similar to a multicast SID 300, but may describe the P2MP path in terms of links instead of in terms of nodes. Hence, the multicast adjacency SID 600 is a different implementation (e.g., different type) of a multicast SID.

A multicast link can be identified and/or addressed by an upstream and/or downstream interface of a node connected to the link. For each node in a network domain, connected multicast links may each be identified by an associated multicast SID, which can be implemented as a multicast adjacency SID 600. A multicast adjacency SID 600 may contain address elements that are locally significant, and hence described relative to a specific node. For example, each node in a network domain may assign a multicast SID from a predetermined multicast SID block to each of the node's links as a multicast adjacency SID 600 for the link. The node may then advertise the multicast adjacency SID 600 describing the link. In another example, a central controller and/or administrator may assign a multicast SID from the predetermined multicast SID block to each link of each node as the multicast adjacency SID 600 for the corresponding link. The controller and/or administrator can then send the multicast adjacency SID 600 describing the link to the node and neighbors of the node. A neighbor node of a current node is any node that shares a direct link with the current node.

The multicast adjacency SID 600 includes a multicast SID adjacency locator 610, a link number 611, and arguments 613. The multicast adjacency SID 600 may be 128 bits long to conform with IPv6 addressing. The multicast SID adjacency locator 610 may be employed to locate a specified node. The multicast SID adjacency locator 610 may include a common prefix allocated for all multicast adjacency SIDs and an appended identifier that is specific to a node. For example, the multicast SID adjacency locator 610 may be substantially similar to a combination of a multicast node SID block 310 and a node ID 311. The multicast SID adjacency locator 610 may be a number of bits (B) long.

The link number 611 may be a link sequence number that identifies each link connected to a node. The link number 611 may be a locally significant value. For example, for all n links of a node, a link sequence number/link number of 1, 2, . . . , n can be assigned to the n links, respectively. As the link number 611 identifies links attached to a node, the link number 611 can uniquely identify an interface of a node, such as a specific interface used as an upstream interface and/or downstream interface along a P2MP path (e.g., a specific downstream port 220 and/or upstream port 250). The link number 611 may be a number of bits (L) long, where B+L is less than 128 bits. The arguments 613 may be substantially similar to arguments 313. The arguments 613 may be less than or equal to 128 bits minus B bits and minus L bits.

FIG. 7 is a schematic diagram of an example encoding of a multicast adjacency SID 700 indicating a link and sub-tree information. Multicast adjacency SID 700 is an example implementation of multicast adjacency SID 600. Hence, the multicast adjacency SID 700 may be used to uniquely identify a link of a network node, such as an interface of a network node 200, positioned along a P2MP path in an IPv6 network, such as P2MP path 107 in a network 100. Multicast adjacency SID 700 may be similar to multicast SID 400, but may be used to identify a link instead of a node. The multicast adjacency SID 700 comprises a multicast SID adjacency locator 710 and a link number 711, which may be substantially similar to the multicast SID adjacency locator 610 and the link number 611, respectively. Further, the multicast adjacency SID 700 comprises arguments 713, which include a number of branches 714 and a number of SIDs 716. The arguments 713, number of branches 714, and number of SIDs 716 may be substantially similar to the arguments 413, the number of branches 414, and the number of SIDs 416, respectively. Hence, the multicast SID adjacency locator 710 and the link number 711 can identify a multicast link as a node interface, and the number of branches 714 and the number of SIDs 716 can be used to create downstream segment lists from upstream segment lists using the mechanisms described above. An example segment list that employs multicast adjacency SIDs 700 is described below.

FIG. 8 is a schematic diagram of example encodings of a segment list 800 describing a SR P2MP path in terms of links in an IPv6 network. Specifically, segment list 800 and segment list 801 describe the P2MP path 107 in network 100. The segment list 800 and segment list 801 are substantially similar to segment list 500 and segment list 501, respectively, but segment lists 800 and 801 describe the P2MP path 107 in terms of links (e.g., node upstream interfaces) instead of nodes. The segment lists 800 and 801 employ multicast adjacency SIDs 600 and/or 700 to address links attached nodes, for examples as upstream interfaces of a node 200, in the P2MP path 107.

The segment lists 800 and 801 each comprise a multicast SID adjacency locator column 810, a link number column 811, a number of branches column 814, a number of SIDs column 816, and an arguments column 813. Each entry of the segment list 800 and/or 801 contains a multicast SID, such as a multicast adjacency SID 700. As such, the multicast SID adjacency locator column 810, the link number column 811, the number of branches column 814, the number of SIDs column 816, and the arguments column 813 contain entries including multicast SID adjacency locators 710, link numbers 711, number of branches 714, number of SIDs 716, and arguments 713, respectively, from multicast adjacency SIDs 700 contained in the segment list 800 and/or 801.

The segment list 801 describes the sub-tree from node PE8 to node PE5, while the segment list 800 describes the sub-tree from node PE8 to nodes PE1-PE4. Hence, the segment list 800 and segment list 801 contain the same information as the segment list 500 and segment list 501, but formats the multicast SIDs in terms of links/upstream interfaces instead of in terms of nodes. The multicast SID adjacency locator column 810 contains substantially the same information as a combination of the multicast node SID column 510 and the node ID column 511. Further, the number of branches column 814, the number of SIDs column 816, and the arguments column 813 contain substantially the same information as the number of branches column 514, the number of SIDs column 516, and the arguments column 513, respectively. In addition, segment lists 800 and 801 also include the link number column 811. The link number column 811 indicate the upstream interfaces/links corresponding to the nodes described by the corresponding entries in the multicast SID adjacency locator column 810.

As such, the segment lists 800 and/or 801 depict an example implementation for encoding a P2MP path, such as P2MP path 107 using link addresses in addition to node addresses. Accordingly, each node along a P2MP path can read a segment list 800 and/or 801 containing multicast SIDs (or portions thereof) indicating link addresses as well as multicast SIDs indicating link addresses in packet destination addresses to correctly copy packets from a stream and create new segment lists for use in handling such packets by downstream nodes. In this way, a packet can be transmitted from a single point to multiple destinations in a stateless manner using link addresses.

An example implementation of the embodiments is described as follows. SR for unicast or Point-to-Point (P2P) paths uses a segment list to describe segments in a path. SR multicast or P2MP path/trees may be implemented using multiple SR P2P paths. The function of a SR P2P path/tree from an ingress node to multiple (e.g., an arbitrary number n) egress/leaf nodes is implemented by n SR P2P paths. These n P2P paths are from the ingress to those n egress/leaf nodes of the P2MP path/tree. This solution may waste some network resources such as link bandwidth.

An alternative solution uses a number of P2MP chain tunnels to implement a P2MP path/tree from an ingress to n egress/leaf nodes. Each P2MP chain tunnel is a tunnel from the ingress to a leaf node as a tail end of the tunnel. Some leaf nodes may be indicated as bud nodes along the tunnel. This alternative solution improves the usage of network resources over the solution above using pure P2P paths. However, these two solutions are based on SR P2P paths. A SR P2MP path/tree may also employ a P2MP multicast tree. For a SR P2MP path/tree from an ingress/root to multiple egress/leaf nodes, a multicast P2MP tree can be created to deliver the traffic from the ingress/root to the egress/leaf nodes. The state of the tree can be instantiated in the forwarding plane by a controller such as a path computation element (PCE) at a root node, intermediate replication nodes, and leaf nodes of the tree. This approach is not consistent with the SR principles in which no state is stored at the core of the network. This example implementation provides a solution for a SR IPv6 (SRv6) P2MP path/tree to deliver traffic from an ingress of a path to the multiple egresses/leaves of the path in a SR domain. This solution uses a P2MP multicast tree without storing a path state in the core of the network for a SR P2MP path/tree.

The following describes an overview of a P2MP multicast tree. For a SR P2P path from an ingress to an egress, a segment list for the path is provided to the ingress. The ingress pushes the list into a packet, and the packet is delivered to the egress according to the segment list without any state in the core of the network. For a SR P2MP path from an ingress to multiple egress/leaf nodes, a segment list for the P2MP path is provided to the ingress. The ingress pushes the list into a packet, and the packet is delivered to the multiple egress/leaf nodes according to the segment list without any state in the core of the network. FIG. 1 shows an example SR P2MP path from ingress/root PE8 to four egress/leaf nodes PE1, PE2, PE3 and PE4. Nodes P1, P2, P3 and P4 are the transit nodes of the P2MP path. Suppose that X-m is the SID of node X. X-m can be an adjacent SID or node SID. For simplicity, X-m is a node SID in the following discussion. PE8-*m*, P1-*m*, P2-*m*, P3-*m*, P4-*m*, PE1-*m*, PE2-*m*, PE3-*m* and PE4-*m* are the SIDs of the nodes on the SR P2MP path. They are multicast SIDs or replication SIDs in general.

A multicast SID is a SID from a multicast SID block. In a SR domain supporting SR multicast, each node has a multicast node SID, which is globally significant. Each adjacency of a node has a multicast adjacency SID, which is locally significant. A multicast SID of a node on a SR P2MP path is associated with the SIDs of the next hop/downstream nodes. When a node receives a packet with the node's multicast SID, the node duplicates and sends the packet to each of the next hop nodes according to their SIDs. If node P on a SR P2MP path has B (B>1) next hop nodes along the path, the SID of node P, P-m, is a multicast SID when P-m is in the segment list for the P2MP path. The SIDs of the B next hop nodes just follow P-m in the segment list. When node P receives the packet with P-m, the node P duplicates and sends the packet to each of the B next hop nodes along the P2MP path.

A segment list for the SR P2MP path in FIG. 1 is pushed onto a packet at ingress/root node PE8. Such segment list may be the following: <P1-*m*, P2-*m*, P3-*m*, PE1-*m*, PE2-*m*, P4-*m*, PE3-*m*, PE4-*m*>. Node P1 has two next hop nodes P2 and P3 along the P2MP path. The next hop nodes' SIDs P2-*m* and P3-*m* follow P1-*m*, which is P1's multicast SID. When P1 receives a packet transported by the P2MP path, P1 duplicates and sends the packet to the next hop nodes P2 and P3 according to P1-*m*, P2-*m*, and P3-*m*. The number of branches or next hops from node P1 is a value of one argument called N-Branches in P1-*m*. The value of N-Branches is two for the multicast SID P1-*m*. With this information, node P1 duplicates and sends the packet to two next hop nodes P2 and P3, which are indicated by the two SIDs P2-*m* and P3-*m* following P1-*m*.

The number of SIDs of the nodes under node P1 is a value of another argument of the multicast SID called N-SIDs. The value of N-SIDs in P1-*m* is seven, indicating that there are seven SIDs following P1-*m* in the segment list. There are two branches or next hops (PE1 and PE2) from node P2 and two SIDs (PE1-*m* and PE2-*m*) of the nodes under node P2. The values of N-Branches and N-SIDs in P2-*m* are two and two. With this information, before sending the packet to node P2, node P1 pushes the SIDs under node P2 onto the packet. The packet has a new segment list with the SIDs under node P2. The new segment list replaces the old one in the packet. There are one branch or next hop (P4) from node P3 and three SIDs (i.e., P4-*m*, PE3-*m* and PE4-*m*) of the nodes under node P3. The values of N-Branches and N-SIDs in P3-*m* are one and three respectively. With this information, before sending the packet to node P3, node P1 pushes the SIDs under node P3 onto the packet. Each node on the SR P2MP path sends the packet to next hop nodes according to the segment list and no state is stored in any transit node, and hence no state is stored in the core of the network. The packet is delivered to the egress/leaf nodes from the ingress.

The following describes encoding a P2MP multicast tree. For each sub-tree STi of a SR P2MP path from the ingress node of the P2MP path, suppose that the multicast SID of the next hop node NHi is mSIDi. Further, there are Bi branches (outgoing interfaces) to the next hop node BNHj (j=1, ..., Bi) from node NHi along the sub-tree, the multicast SID of BNHj is mSIDij. Also, the number of branches (outgoing interfaces) under the node BNHj (j=1, ..., Bi) is BBj. In addition, the number of SIDs of the nodes under each of the Bi branches from node BNHj is NSj (j=1, ..., Bi). Sub-tree STi is encoded as segment list as follows:

<mSIDi, mSIDi1, ..., mSIDiBi, SegSeq1, ..., SegSeqBi>, where mSIDi is the SID of NHi, mSIDi1 through mSIDiBi are the SIDs of the Bi branches/next-hops BNHj of node NHi respectively, SegSeq1 is the sequence of the SIDs for the sub-tree from BNH1, and SegSeqBi is the sequence of the SIDs for the sub-tree from BNHBi. Specifically, mSIDi contains the number of branches, Bi, in a N-Branches field, and the number of SIDs under mSIDi in a N-SIDs field. mSIDij (j=1, ..., Bi) contains the number of branches, BBj, in a N-Branches field and the number of SIDs, NSj, in a N-SIDs field. SegSeqj (j=1, ..., Bi) is the SID sequence in the segment list encoding the sub-trees from node BNHj.

For the P2MP path in FIG. 1 from ingress node PE8 to egress nodes PE1, PE2, PE3 and PE4, there is one sub-tree from PE8. For this sub-tree, the next hop node is P1 and the multicast SID of P1 is P1-*m*. There are two branches to the next hop nodes P2 and P3 from node P1 along the sub-tree. The number of SIDs of the nodes under P1 is seven. The multicast SIDs of P2 and P3 are P2-*m* and P3-*m* respectively. The numbers of SIDs of the nodes under these two branches are two and three, respectively. The SIDs of the nodes under P2 are PE1-*m* and PE2-*m*. The SIDs of the nodes under P3 are P4-*m*, PE3-*m*, and PE4-*m*. The sub-tree is encoded as segment list as follows:

<P1-*m*, P2-*m*, P3-*m*, PE1-*m*, PE2-*m*, P4-*m*, PE3-*m*, PE4-*m*>, where P1-*m* is the SID of P1, P2-*m* and P3-*m* are the SIDs of the two branches/next-hops P2 and P3 of node P1 respectively, PE1-*m* and PE2-*m* are the SID sequence for the sub-tree from P2, and P4-*m*, PE3-*m*, PE4-*m* are the SID sequence for the sub-tree from P3. Specifically, P1-*m*'s N-Branches field is set to two with a N-SIDs field set to seven. P2-*m*'s N-Branches field is set to two with a N-SIDs field set to two. P3-*m*'s N-Branches field is set to one with a N-SIDs field set to three. PE1-*m* and PE2-*m* are the SID sequence in the segment list encoding the sub-trees from P2. P4-*m*, PE3-*m*, and PE4-*m* are the SID sequence in the segment list encoding the sub-trees from P3. P4-*m*'s N-Branches field is set to two with a N-SIDs field set to two. FIG. 5 shows an example of a detailed segment list, which is an encoding of the P2MP multicast tree for the SR P2MP path from PE8 to PE1, PE2, PE3 and PE4. The SID P1-*m* indicates that there are two branches and seven SIDs under P1. SID P2-*m* indicates that there are two branches and two SIDs under P2. SID P3-*m* indicates that there are one branch and three SIDs under P3. SIDs PE1-*m* and PE2-*m* indicate that there is no branch under them. SID P4-*m* indicates that there are two branches and two SIDs under P4. PE3-*m* and PE4-*m* indicate that there is no branch under them.

The procedures and/or behaviors on the ingress, transit, and egress/leaf nodes of a SR P2MP path are described below. Such procedures/behaviors support delivering a packet received from the path to the packet's destinations.

The procedure/behavior on ingress node can be described as follows. For a packet to be transported by a SR P2MP Path, the ingress of the P2MP path duplicates the packet for each sub-tree of the SR P2MP path branching from the ingress, pushes the segment list encoding the sub-tree onto the packet by executing an encapsulation algorithm, and sends the packet to the next hop node along the sub-tree. For example, there is one sub-tree from the ingress PE8 of the SR P2MP path in FIG. 1 via next hop node P1 towards egress/leaf nodes PE1, PE2, PE3 and PE4.

For this sub-tree, the ingress PE8 duplicates the packet, sets the destination address (DA) to P1-*m* (multicast SID of node P1), pushes the segment list without P1-*m* (<P2-*m*, P3-*m*, PE1-*m*, PE2-*m*, P4-*m*, PE3-*m*, PE4-*m*>) encoding the sub-tree in a Segment Routing Header (SRH) of the packet by executing an encapsulation algorithm, and sends the packet to the DA (node P1). The contents of the multicast SIDs P1-*m*, P2-*m*, P3-*m*, PE1-*m*, PE2-*m*, P4-*m*, PE3-*m*, PE4-*m* are shown in FIG. 5. Suppose that the duplicated packet is Pkt0 for the sub-tree. The execution of the encapsulation algorithm pushes an IPv6 header (SRH) to Pkt0 and sets some fields in the header to produce an encapsulated packet Pkt'. Pkt' is represented as follows:

Pkt'=(SA=PE8, DA=P1-*m*)(PE4-*m*, PE3-*m*, . . . , P3-*m*, P2-*m*; SL=7) Pkt0 where DA=P1-*m* indicates that the destination address is set to P1-*m*, SA=PE8 indicates that the source address (SA) is set to PE8; SL=7 indicates that the number of Segments Left (SL) is seven, and the remaining data is the segment list for the P2MP path.

The procedure/behavior of a transit node may be described as follows. When a transit node of a SR P2MP path receives a packet transported by the P2MP path, the DA of the packet is a multicast SID of the node and the packet contains a segment list for the sub-trees under the transit node. The DA and the segment list comprise the information for encoding the sub-trees. For example, when node P1 receives a packet transported by the SR P2MP path in FIG. 1, the packet's DA is P1-*m* (which is a multicast SID of node P1) and the segment list in the packet is <P2-*m*, P3-*m*, PE1-*m*, PE2-*m*, P4-*m*, PE3-*m*, PE4-*m*>. The N-Branches field (which has a value of n) of the DA indicates that there are n branches/sub-trees under the transit node. The N-SIDs field of the DA indicates the number of SIDs for these n sub-trees under the transit node. The multicast SIDs of the next hop nodes of these n sub-trees are the first n multicast SIDs of the segment list in the packet. For example, the N-Branches field (which has value of two) of DA=P1-*m* indicates that there are two branches/sub-trees under node P1. The N-SIDs field (which has value of seven) of the DA=P1-*m* indicates that there are seven SIDs for these two sub-trees under node P1. The first multicast SID (P2-*m*) of the segment list is the SID of the next hop node (P2) of the first sub-tree. The second multicast SID (P3-*m*) of the segment list is the SID of the next hop node (P3) of the second sub-tree.

After the multicast SIDs of the next hop nodes, there are n blocks of SIDs for those n sub-trees. The N-SIDs field (which has value of B1) of the first multicast SID of the next hop nodes indicates that there are B1 SIDs in the first block for the first sub-tree. The N-SIDs field (which has value of B2) of the second multicast SID of the next hop nodes indicates that there are B2 SIDs in the second block for the second sub-tree after the first block, and so on. For example, there are two blocks of SIDs for the two sub-trees under node P1 after the multicast SIDs P2-*m* and P3-*m* of the next hop nodes P2 and P3. The N-SIDs field of P2-*m* (the first multicast SID of the next hop nodes) has value of two, indicating that there are two SIDs in the first block for the first sub-tree, which are PE1-*m* and PE2-*m*. The N-SIDs field of P3-*m* (the second multicast SID of the next hop nodes) has value of three, indicating that there are three SIDs in the second block for the second sub-tree after the first block, which are P4-*m*, PE3-*m*, and PE4-*m*.

The transit node duplicates the packet without the top header for each sub-tree under the transit node and adds a new header with a new segment list built from the SID block for the sub-tree to the duplicated packet by executing the encapsulation algorithm. The transit node sets the DA of the packet to the multicast SID of the next hop node along the sub-tree and sends the packet to the DA. For example, node P1 duplicates the packet for the first sub-tree towards PE1 and PE2 and adds a new header with a new segment list <PE1-*m*, PE2-*m*>. The transit node sets DA=P2-*m* (multicast SID of next hop P2), and sends the packet to the DA (P2).

Suppose that the duplicated packet is Pkt0 for the sub-tree. The execution of encapsulation pushes a new IPv6 header (SRH) to Pkt0 and sets some fields in the header to produce an encapsulated packet Pkt'. Pkt' is represented as follows:

Pkt'=(SA=P1, DA=P2-*m*)(PE2-*m*, PE1-*m*; SL=2) Pkt0, where DA=P2-*m* indicates that the destination address is set to P2-*m*, SA=P1 indicates that the source address is set to P1, SL=2 indicates that the number of segments left is two, and the remaining data describes the segment list of a first sub-tree rooted at the transit node.

Node P1 also duplicates the packet for the second sub-tree via P3 towards PE3 and PE4 and adds a new header with a new segment list <P4-*m*, PE3-*m*, PE4-*m*>. The node P1 also sets DA=P3-*m* (multicast SID of next hop P3), and sends the packet to the DA (P3).

The procedure/behavior of the egress node is as follows. When an egress node of a SR P2MP path receives a packet transported by the P2MP path, the DA of the packet is a SID of the egress node. The egress node sends the packet to the destination accordingly. If the SID is a multicast SID of the egress, the N-Branches field and N-SIDs field are all zeros.

Protection is described as follows. Protection for a SR P2MP path can be classified into two types: global protection and local protection. Global Protection is described as follows. For a primary SR P2MP path from an ingress node R1 to multiple egress nodes Li (i=1, . . . , n), a backup SR P2MP path from an ingress node R1' to multiple egress nodes Li' (i=1, . . . , n) can be set up to provide global protection for the primary SR P2MP path. If R1' is the same as R1, the failure of the ingress node R1 of the primary SR P2MP path is not protected. Otherwise (R1' and R1 are different and connected to the same traffic source), the failure of the ingress node R1 is protected. If Li' is the same as Li (i=1, . . . , n), the failure of the egress nodes Li (i=1, . . . , n) of the primary SR P2MP path is not protected. Otherwise (Li' and Li are different and connected to the same destination), the failure of the egress nodes Li is protected. When a failure happens on the primary SR P2MP path and is detected by the source of the traffic or other entity, the traffic to be transported by the primary SR P2MP path is switched to the backup SR P2MP path, which sends the traffic from an ingress node R1' to an egress nodes Li' (i=1, . . . , n).

Local protection is described as follows. Local protection such as Fast Reroute (FRR) of a node and adjacency segment on a SR P2P path may be applied. For example, such mechanisms can be applied to FRR of a node and adjacency segment on a SR P2MP path in a similar way. But FRR for an SR P2MP path is more complicated.

FIG. 9 is a flowchart of an example method 900 of transmitting packets to an SR P2MP path, such as P2MP path 107, by an ingress node, such as ingress node 101 and/or network node 200, at the edge of an IPv6 network, such as network 100. For example, the ingress node can generate segment lists to describe the P2MP path and encapsulate packets from a stream with the segment lists to ensure the packets are forwarded along the P2MP path. In an example, the ingress node can employ multicast SIDs that indicate nodes, in which case the ingress node can employ segment lists such as segment list 500 and/or 501 that contain multicast SIDs 300 and/or 400. In another example, the ingress node can employ multicast SIDs that indicate links, in which case the ingress node can employ segment lists such as segment list 800 and/or 801 that contain multicast adjacency SIDs 600 and/or 700. It should be noted that the term multicast SID may apply to multicast SIDs that indicate nodes, multicast adjacency SIDs that indicate links, or combinations thereof.

Prior to method 900, a P2MP path is computed from a source to a plurality of destinations via the ingress node and though a network. The P2MP path may be computed by a controller, such as a path computation element, and/or by the ingress node. The ingress node then generates and/or stores one or more segment lists describing the P2MP path (e.g., in a forwarding table) and associates such segment lists with a stream of packets. At step 901, the ingress node 901 receives a packet associated with the stream. Such association may be determined based on packet source address and/or other information in a packet header.

The ingress node determines to send the packet along the P2MP path. The ingress node may duplicate the packet to generate a copy of the packet at step 903 when the P2MP path includes two or more branches downstream from the ingress node. For example, the ingress node may duplicate the packet when the packet is associated with a plurality of stored segment lists and/or entries in a forwarding table.

At step 905, the ingress node pushes a segment list onto the packet by employing an encapsulation mechanism. For example, when the packet is duplicated at step 903, the segment list is a first segment list and is pushed onto the received packet, which may also be referred to as a first packet for clarity of discussion. The segment list describes a SR based P2MP path though the network, or a portion thereof. For example, the segment list describes the entire P2MP path when there is a single downstream branch of the P2MP path proceeding from the ingress node. When there are a plurality of downstream branches of the P2MP path proceeding from the ingress node (e.g., the packet has been duplicated at step 903), the segment list describes a sub-tree of the P2MP path that proceeds from the ingress node along the corresponding branch.

Specifically, the segment list comprises multicast SIDs of each node or each link, depending on the example, in the corresponding tree/sub-tree of the SR P2MP path. For example, each multicast SID may comprise a multicast block prefix, a node identifier, and arguments. When the multicast SIDs reference nodes, the multicast SID block prefix, node identifier, and arguments may be implemented as a multicast node SID block, a node ID, and arguments according to multicast SIDs 300 and/or 400. As another example, each multicast SID may comprise a multicast adjacency SID locator, a link number, and arguments. When the multicast SIDs reference links, the multicast adjacency SID locator, node identifier, and arguments may be implemented as a multicast adjacency SID locator, a link number, and arguments according to multicast adjacency SIDs 600 and/or 700. In either case, the arguments for each multicast SID may comprise a number of branches of the sub-tree that are associated with a corresponding node. This indicates the number of downstream branches of the P2MP path that extend directly from downstream interfaces of the node designated by the multicast SID. Further, the arguments for each multicast SID may also comprise a number of SIDs included in the sub-tree downstream of the corresponding node. This indicates the number of multicast nodes in the P2MP path that are downstream of the node designated by the multicast SID. By employing such arguments accordingly to the mechanisms described above, the segment list(s) describe the SR P2MP path in a manner that allows for implementation of the SR P2MP path in a stateless manner across the network.

In some examples, pushing the segment list onto the packet at step 905 may include removing the first multicast SID from the corresponding segment list. The first multicast SID in the segment lists represents the next hop link/node, which is directly connected to the current node (e.g., the ingress node) via a downstream interface associated with a corresponding branch of the P2MP path. The first multicast SID from the segment list indicating the next hop along the tree/sub-tree of the SR P2MP path is set as the destination address of the packet.

At step 907, the ingress node pushes a second segment list onto the copy of the packet when the packet is duplicated at step 903. When the packet is duplicated at step 903, there are two or more branches of the P2MP path that proceed directly from the ingress node. Hence, the second segment list describes a second sub-tree of the P2MP path that proceeds from the ingress node along a corresponding branch (e.g., second branch). As such, the first segment list pushed onto the packet and the second segment list pushed onto the copy of the packet describe different sub-trees of the SR P2MP path. The second segment lists may contain substantially the same information as the first segment list (e.g., multicast SIDs 300/400 and/or multicast adjacency SIDs 600/700), but describes a different sub-tree of the P2MP path. Further, pushing the second segment list into the copy of the packet may comprise removing the first multicast SID from the second segment list. This multicast SID represents the next hop link/node, which is directly connected to the current node (e.g., the ingress node) via a second downstream interface associated with a corresponding branch of the P2MP path. The first multicast SID from the second segment list indicating the next hop along the sub-tree of the SR P2MP path is set as the destination address of the copy of the packet.

At step 909, the ingress node transmits the packet on a first downstream interface along the SR P2MP path, for example via the relevant branch associated with the first segment list. At step 911, the ingress node transmits the copy of the packet on a second downstream interface along the SR P2MP path, for example via the relevant branch associated with the second segment list. Since the first interface and the second interface are connected to different sub-trees of the P2MP path, the copy of the packet is transmitted across a different downstream interface than the packet (e.g., the first interface and the second interface are different interfaces).

FIG. 10 is a flowchart of an example method 1000 of forwarding packets along an SR P2MP path, such as P2MP path 107, by a transit node, such as a transit node 103 and/or network node 200, in an IPv6 network, such as network 100. For example, the transit node can receive a packet containing an upstream segment list and an upstream destination address indicating the transit node. The transit node can then optionally duplicate the packet, create one or more downstream segment lists and/or downstream destination addresses, and include such downstream segment lists and/or downstream destination addresses in corresponding packets for transmission along the P2MP path. In an example, the transit node can employ multicast SIDs that indicate nodes, in which case the transit node can employ segment lists such as segment list 500 and/or 501 that contain multicast SIDs 300 and/or 400. In another example, the transit node can employ multicast SIDs that indicate links, in which case the transit node can employ segment lists such as segment list 800 and/or 801 that contain multicast adjacency SIDs 600 and/or 700. It should be noted that the term multicast SID may apply to multicast SIDs that indicate nodes, multicast adjacency SIDs that indicate links, or combinations thereof.

The transit node is positioned in a network, such as an IPv6 network, and is positioned along a SR based P2MP path. However, the transit node does not store a state for the SR P2MP path. Hence, the transit node may not be aware of the SR P2MP path. As such, the transit node forwards packets along the P2MP path based on segment lists and/or multicast SIDs contained in the packets. As such, the transit node receives a packet comprising an upstream segment list describing one or more sub-trees of the SR P2MP path at step 1001. The packet may also comprise an upstream destination address that contains a multicast SID indicating the transit node. The term upstream is used for clarity of discussion and indicates that such information is received in the packet coming from the upstream direction.

At step 1003, the transit node determines a downstream segment list based on the upstream segment list and/or the upstream destination address. The downstream segment list describes a sub-tree for a downstream interface of the transit node included in the SR P2MP path. Depending on the data in the upstream segment list and/or the upstream destination address, the transit node can also determine a second downstream segment list describing a second sub-tree for the second downstream interface included in the SR P2MP path. Additional downstream segment lists may also be created as indicated by the upstream segment list and/or the upstream destination address. For example, determining the second downstream segment list may comprise generating the second downstream list to include only multicast SIDs associated with the second sub-tree for the second downstream interface based on the number of branches indicated in the destination address and the number of SIDs for each next hop node.

For example, the packet, as received, contains an upstream destination address identifying the transit node. The upstream destination address includes arguments comprising a number of branches of the P2MP path that extend directly from the transit node via connection(s) to downstream interface(s). The number of branches from the upstream destination address indicates the number of entries in the segment list that indicate next hop nodes from the transit node. Further, the upstream destination address includes a number of SIDs included in sub-tree(s) downstream of the transit node. The number of SIDs from the upstream destination address indicate a number of multicast SIDs contained in the segment list. In addition, the upstream segment list comprises multicast SIDs of each node or each link, depending on the example, in the sub-tree(s) associated with the transit node. As noted above, the multicast SIDs can be formatted to address nodes or links, for example, by employing multicast SIDs 300 and/or 400 and/or multicast adjacency SIDs 600 and/or 700. The multicast SIDs may also each comprise a number of branches downstream from the corresponding node and a number of SIDs included in any sub-tree(s) downstream of the corresponding node.

The preceding information can be used to determine the downstream segment list(s). Specifically, the transit node can employ the number of branches indicated in the upstream destination address to determine a number of next hop nodes. A segment list should be created for each next hop node. For example, when the number of branches is three, the transit node should create a downstream segment list for the first three multicast SIDs in the upstream segment list. The transit node can then employ the number of SIDs for each next hop node to determine a number of multicast SIDs in each sub-tree associated with the each next hop node. The corresponding multicast SIDs for each next hop node can be included each such segment list. For example, if the multicast SID for the first next hop node contains a number of SIDs set to five, then the next five entries after the last entry associated with the next hop node are included in the downstream segment list for the first next hop node. The number of SIDs in the multicast SID for the second next hop node can then be used to generate the downstream segment list for the second next hop node, etc. until all of the multicast SIDs indicated in the upstream destination address have been identified as next hop nodes or included in one of the segment lists. Hence, the transit node may generate the downstream segment list(s) including only multicast SIDs associated with a sub-tree rooted at the transit node via a corresponding P2MP path branch and including the next hop node directly connected to a corresponding downstream interface.

At step 1005, the transit node can duplicate the packet to generate a copy of the packet for transmission on the second downstream interface (and third, fourth, etc.) of the transit node. For example, the transit node can employ the number of branches indicated in the upstream destination address to determine whether and how many times the packet should be duplicated. For example, the transit node should duplicate the packet one time for each branch indicated by the upstream destination address in excess of one.

At step 1007, the transit node can replace the upstream segment list contained in the packet, as received, with the corresponding (e.g., first) downstream segment list as determined in step 1003. In the event that the packet is duplicated at step 1005, the transit node may also replace the upstream segment list associated with the copy of the packet with the second downstream segment list at step 1009. Additional segment lists can be included in additional copies of packets as desired to ensure each copied packet receives a corresponding segment list. It should be noted that the upstream segment list may or may not be copied when the packet is duplicated at step 1005. For example, replacing the upstream segment list with the second downstream segment list may include duplicating the packet containing the upstream segment list and then replacing the upstream segment list with the second downstream segment list in the copy of the packet. In other examples, replacing the upstream segment list with the second downstream segment list includes removing the upstream segment list from the packet prior to duplication and pushing the second downstream segment list onto the copy of the packet using an encapsulation algorithm. In either case, replacing the upstream segment list with the downstream segment list (or second downstream segment list) may comprise setting a multicast SID of a next hop along the corresponding sub-tree for the downstream interface as a destination address of the packet and removing the multicast SID for the next hop from the corresponding segment list.

At step 1011, the transit node transmits the packet(s) downstream. For example, the packet may be transmitted on the downstream interface along the SR P2MP path. Further, the copy of the packet may be transmitted on the second downstream interface along the SR P2MP path. Additional packets may also be transmitted along additional downstream interfaces as indicated by the number of branches in the upstream destination address in order to ensure that the packets are forwarded along all branches of the P2MP path that traverse the transit node.

Figure 11:
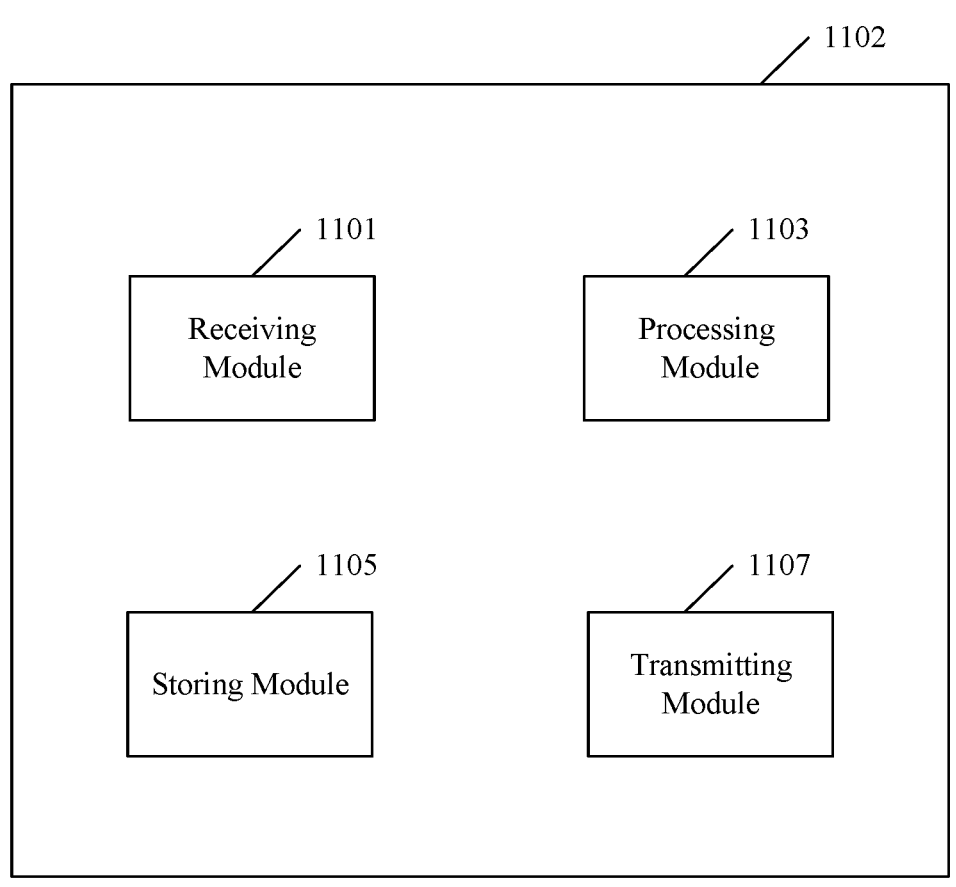
FIG. 11 is an embodiment of a device for maintaining a SR P2MP path in an IPv6 network.

FIG. 11 is an embodiment of a device 1100 for maintaining a SR P2MP path in an IPv6 network. For example, device 1100 may be employed to implement method 900 and/or 1000. Further, device 1100 may be employed as a node, such as a network node 200 and/or an ingress node 101, a transit node 103, and/or an egress node 105 in a network 100. As a specific example, the device 1100 may employ segment lists 500 and/or 501 containing multicast SIDs, such as a multicast SID 300 and/or 400. Further, the device 1100 may employ segment lists 800 and/or 801 containing multicast adjacency SIDs, such as a multicast adjacency SIDs 600 and/or 700.

In an example, the device 1100 includes a receiving module 1101 for receiving a packet. The device 1100 also includes a processing module 1103 for pushing a segment list describing a SR P2MP path onto the packet. The device 1100 includes a storing module 1105 for storing a packet and/or a segment list. The device 1100 also includes a transmitting module 1107 for transmitting the packet on a downstream interface along the SR P2MP path.

In another example, the device 1100 includes a receiving module 1101 for receiving a packet comprising an upstream segment list describing one or more sub-trees of a SR P2MP path. The device 1100 also includes a processing module 1103 for determining, based on the upstream segment list, a downstream segment list describing a sub-tree for a downstream interface of the transit node included in the SR P2MP path. The processing module 1103 is also for replacing the upstream segment list associated with the packet with the downstream segment list. The device 1100 includes a storing module 1105 for storing a packet and/or a segment list. The device 1100 also includes a transmitting module 1107 for transmitting the packet on the downstream interface along the SR P2MP path.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an ingress node in a network, the method comprising:
   receiving a packet;
   pushing a segment list describing a segment routing point-to-multipoint (SR P2MP) path onto the packet, wherein the segment list in the packet comprises multicast segment identifiers (SIDs) of each node or each link in each sub-tree of the SR P2MP path such that the packet is routable across the network without reference to any SR P2MP path state stored in any transit node along the SR P2MP path; and
   transmitting the packet on a downstream interface along the SR P2MP path,
   wherein the SR P2MP path is stateless across the network such that SR P2MP path state is not maintained at any transit node.

2. The method of claim 1, further comprising transmitting a copy of the packet on a different downstream interface than the packet, wherein the copy of the packet comprises a second segment list, and wherein the segment list and the second segment list describe different sub-trees of the SR P2MP path.

3. The method of claim 1, wherein pushing the segment list onto the packet further comprises setting a multicast SID of a next hop along a sub-tree of the SR P2MP path as a destination address of the packet.

4. The method of claim 1, wherein each multicast SID comprises a multicast block prefix, a node identifier, and arguments.

5. The method of claim 1, wherein each multicast SID comprises a multicast adjacency SID locator, a link number, and arguments.

6. The method of claim 1, wherein each multicast SID comprises arguments, wherein the arguments comprise a number of branches of the sub-tree that are associated with a corresponding node and a number of SIDs included in the sub-tree downstream of the corresponding node.

7. A method implemented by a transit node in a network along a segment routing point-to-multipoint (SR P2MP) path, the method comprising:
   receiving a packet comprising an upstream segment list describing one or more sub-trees of the SR P2MP path, wherein the upstream segment list in the packet comprises multicast segment identifiers (SIDs) of each node or each link in each sub-tree of the SR P2MP path such that the packet is routable across the network without reference to any SR P2MP path state stored in any transit node along the SR P2MP path;

determining, based on the upstream segment list, a downstream segment list describing a sub-tree for a downstream interface of the transit node included in the SR P2MP path;

replacing the upstream segment list associated with the packet with the downstream segment list; and transmitting the packet on the downstream interface along the SR P2MP path, wherein the SR P2MP path is stateless across the network such that SR P2MP path state is not maintained at any transit node.

8. The method of claim 7, further comprising:

duplicating the packet to generate a copy of the packet for transmission on a second downstream interface of the transit node;

determining, based on the upstream segment list, a second downstream segment list describing a second sub-tree for the second downstream interface included in the SR P2MP path;

replacing the upstream segment list associated with the copy of the packet with the second downstream segment list; and transmitting the copy of the packet on the second downstream interface along the SR P2MP path.

9. A method implemented by a transit node in a network along a segment routing point-to-multipoint (SR P2MP) path, the method comprising:

receiving a packet comprising an upstream segment list describing one or more sub-trees of the SR P2MP path;

determining, based on the upstream segment list, a downstream segment list describing a sub-tree for a downstream interface of the transit node included in the SR P2MP path;

replacing the upstream segment list associated with the packet with the downstream segment list; and transmitting the packet on the downstream interface along the SR P2MP path, duplicating the packet to generate a copy of the packet for transmission on a second downstream interface of the transit node;

determining, based on the upstream segment list, a second downstream segment list describing a second sub-tree for the second downstream interface included in the SR P2MP path;

replacing the upstream segment list associated with the copy of the packet with the second downstream segment list; and transmitting the copy of the packet on the second downstream interface along the SR P2MP path, wherein the SR P2MP path is stateless across the network such that SR P2MP path state is not maintained at any transit node, and wherein replacing the upstream segment list with the second downstream segment list includes duplicating the packet containing the upstream segment list and then replacing the upstream segment list with the second downstream segment list in the copy of the packet.

10. The method of claim 9, wherein replacing the upstream segment list with the second downstream segment list includes removing the upstream segment list from the packet prior to duplication and pushing the second downstream segment list onto the copy of the packet.

11. The method of claim 9, wherein the packet, as received, contains a destination address identifying the transit node, wherein the destination address includes arguments comprising a number of branches associated with the transit node.

12. The method of claim 11, wherein the upstream segment list comprises multicast segment identifier (SIDs) of each node or each link in a sub-tree associated with the transit node, and wherein each multicast SID comprises a number of SIDs included in a sub-tree downstream of a corresponding node.

13. The method of claim 12, wherein determining the downstream segment list comprises:

employing the number of branches indicated in the destination address to determine a number of next hop nodes;

employing the number of SIDs in a multicast SID for each next hop node to determine a number of multicast SIDs in each sub-tree associated with the each next hop node; and generating the downstream segment list including only multicast SIDs associated with the sub-tree for the next hop node associated with the downstream interface.

14. The method of claim 13, wherein determining the second downstream segment list comprises generating the second downstream segment list including only the multicast SIDs associated with the second sub-tree for the second downstream interface based on the number of branches indicated in the destination address and the number of SIDs in the multicast SID for each next hop node.

15. The method of claim 9, wherein replacing the upstream segment list with the downstream segment list further comprises setting a multicast SID of a next hop along a sub-tree for the downstream interface as a destination address of the packet, and wherein the transit node does not store a state for the SR P2MP path.

* * * * *